US012356073B2

(12) United States Patent
Nakata

(10) Patent No.: US 12,356,073 B2
(45) Date of Patent: Jul. 8, 2025

(54) IMAGING APPARATUS

(71) Applicant: Panasonic Intellectual Property Management Co., Ltd., Osaka (JP)

(72) Inventor: Shusaku Nakata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 117 days.

(21) Appl. No.: 18/518,497

(22) Filed: Nov. 23, 2023

(65) Prior Publication Data

US 2024/0179412 A1 May 30, 2024

(30) Foreign Application Priority Data

Nov. 25, 2022 (JP) ................................ 2022-188716

(51) Int. Cl.
*H04N 23/68* (2023.01)

(52) U.S. Cl.
CPC ....... *H04N 23/687* (2023.01); *H04N 23/6812* (2023.01)

(58) Field of Classification Search
CPC ... H04N 23/687; H04N 23/6812; H04N 23/60
USPC .................................................... 348/208.2
See application file for complete search history.

(56) References Cited

U.S. PATENT DOCUMENTS

| 8,134,603 | B2* | 3/2012 | Auberger | H04N 23/68 |
| | | | | 382/296 |
| 9,253,400 | B2* | 2/2016 | Miyahara | H04N 23/6842 |
| 9,432,578 | B2* | 8/2016 | Shintani | H04N 23/682 |
| 9,503,647 | B2* | 11/2016 | Shibata | G02B 27/646 |
| 10,848,765 | B2* | 11/2020 | Joshi | H04L 65/762 |
| 11,082,619 | B2* | 8/2021 | Yukitake | H04N 23/687 |

(Continued)

FOREIGN PATENT DOCUMENTS

| JP | 2006-071743 A | 3/2006 |
| JP | 2019-164338 A | 9/2019 |

(Continued)

OTHER PUBLICATIONS

Japanese Office Action dated Jan. 17, 2023 for the corresponding Japanese Patent Application No. 2022-188716 with its Machine English Translation.

*Primary Examiner* — Pritham D Prabhakher
(74) *Attorney, Agent, or Firm* — Renner, Otto, Boisselle & Sklar, LLP

(57) ABSTRACT

An imaging apparatus includes: an image sensor that captures a subject image via an optical system; a detector that detects a shake amount of the imaging apparatus; a calculation circuitry that performs a calculation for image stabilization, based on the shake amount detected by the detector; and an image stabilizer that performs the image stabilization by translational movement and rotational movement within a predetermined movable range of the image sensor, based on a result of the calculation by the calculation circuitry. The calculation circuitry changes a first maximum amount and a second maximum amount within the movable range, according to a result of successively calculating a shake correction amount, the first maximum amount allowing a first movement of the translational movement and the rotational movement, the second maximum amount allowing a second movement of the translational movement and the rotational movement.

12 Claims, 15 Drawing Sheets

(56) References Cited

U.S. PATENT DOCUMENTS

| | | | | |
|---|---|---|---|---|
| 11,102,412 B1* | 8/2021 | Nakata | | H04N 23/683 |
| 11,159,726 B2* | 10/2021 | Ito | | G03B 5/00 |
| 11,381,746 B2* | 7/2022 | Ikeda | | H04N 23/681 |
| 11,516,399 B2* | 11/2022 | Shingu | | H04N 23/685 |
| 11,825,199 B2* | 11/2023 | Ishibiki | | H04N 23/663 |
| 2009/0180770 A1* | 7/2009 | Honjo | | H04N 23/687 |
| | | | | 396/55 |
| 2010/0253793 A1* | 10/2010 | Auberger | | H04N 23/6811 |
| | | | | 348/208.4 |
| 2014/0267807 A1* | 9/2014 | Miyahara | | H04N 23/667 |
| | | | | 348/208.4 |
| 2015/0271410 A1* | 9/2015 | Shintani | | H04N 23/6812 |
| | | | | 348/208.4 |
| 2015/0277139 A1* | 10/2015 | Shibata | | H04N 23/687 |
| | | | | 359/557 |
| 2015/0281581 A1* | 10/2015 | Sakurai | | H04N 23/6812 |
| | | | | 348/208.2 |
| 2015/0281582 A1* | 10/2015 | Sakurai | | H04N 23/6812 |
| | | | | 348/208.2 |
| 2016/0330377 A1* | 11/2016 | Tsuchiya | | G03B 17/14 |
| 2017/0041545 A1* | 2/2017 | Murgia | | H04N 23/6812 |
| 2017/0257574 A1* | 9/2017 | Honjo | | H04N 23/687 |
| 2019/0230287 A1* | 7/2019 | Shingu | | H04N 23/55 |
| 2019/0230288 A1* | 7/2019 | Tsuchiya | | H04N 23/687 |
| 2019/0289216 A1 | 9/2019 | Ito | | |
| 2020/0084358 A1* | 3/2020 | Nadamoto | | G02B 27/646 |
| 2020/0249421 A1* | 8/2020 | Hu | | H04N 23/6812 |
| 2021/0075967 A1 | 3/2021 | Yukitake et al. | | |
| 2021/0136290 A1 | 5/2021 | Ikeda | | |
| 2021/0208416 A1* | 7/2021 | Ohishi | | G03B 5/02 |
| 2021/0360159 A1* | 11/2021 | Shingu | | H04N 23/683 |
| 2023/0007177 A1* | 1/2023 | Ishibiki | | H04N 23/54 |

FOREIGN PATENT DOCUMENTS

| | | |
|---|---|---|
| JP | 2019-219579 A | 12/2019 |
| JP | 2021-021754 A | 2/2021 |
| JP | 2021-071574 A | 5/2021 |
| JP | 2021-113859 A | 8/2021 |
| WO | 2021/048963 A1 | 3/2021 |

* cited by examiner

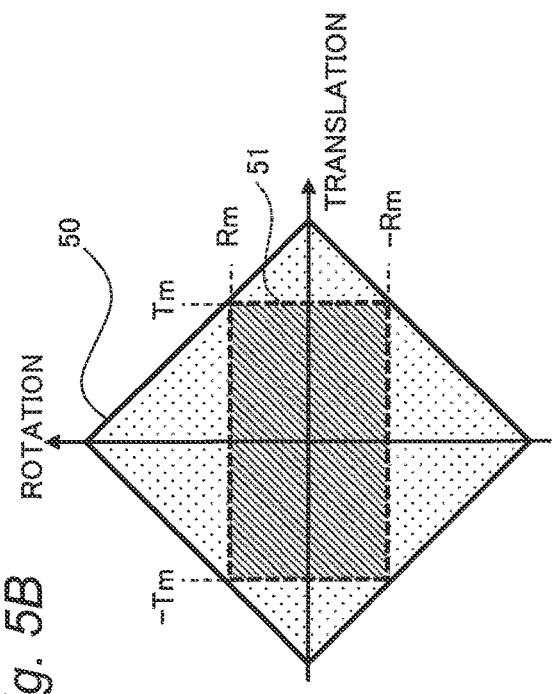
Fig. 5B
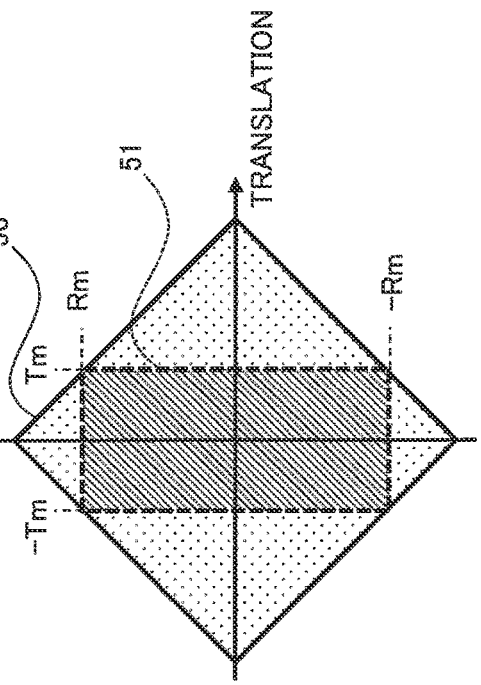
Fig. 5C
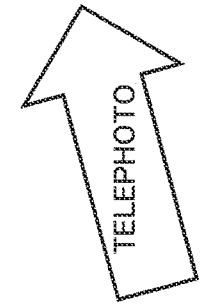
TELEPHOTO
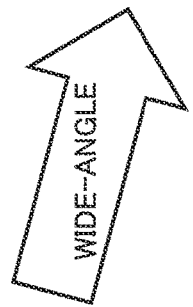
WIDE-ANGLE
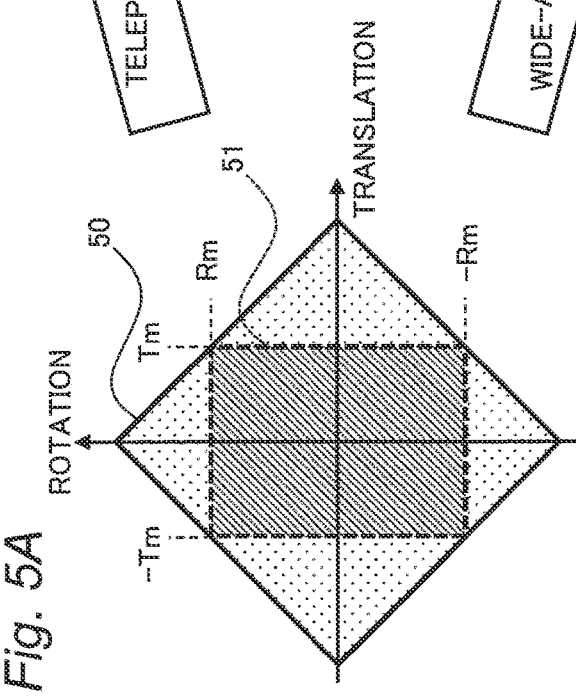
Fig. 5A

IMAGING APPARATUS

TECHNICAL FIELD

The present disclosure relates to imaging apparatuses having camera shake correcting functions.

BACKGROUND

JP 2021-71574 A discloses a vibration isolation apparatus for the purpose of effectively utilizing a correction range for image stabilization in various shooting states. The vibration isolation apparatus sets a correction axis for use in vibration isolation control according to a shooting state such as during light exposure in a still-image mode, during standby, or during being in a moving-image mode. Furthermore, in order to effectively correct roll shakes occurring during shooting a moving image, particularly during shooting while walking, the vibration isolation apparatus allocates a larger amount of correction to roll shakes in a rotational direction, while allocating a smaller amount of correction to shakes in a translational direction, during shooting a moving image. Further, JP 2021-71574 A also discloses using information from a camera shake detector, in order to determine a state of shooting while walking. The allocation of the amount of correction is changed according to a shooting condition such as shooting while walking, fixed point shooting, and macro photographing.

SUMMARY

In JP 2021-71574 A, the allocation of the amount of correction is performed according to a shooting condition such as shooting while walking. Therefore, for example, in the event of occurrence of a camera shake having a smaller amplitude in the rotational direction and a larger amplitude in the translational direction, under this shooting condition, the camera shake may be difficult to correct. As described above, conventional techniques has a problem of difficulty in effectively using a range within which an imaging apparatus is inherently capable of correcting various camera shakes.

The present disclosure provides an imaging apparatus capable of effectively using a range within which the imaging apparatus is capable of correcting various camera shakes.

An imaging apparatus in one aspect of the present disclosure includes: an image sensor that captures a subject image via an optical system; a detector that detects a shake amount of the imaging apparatus; a calculation circuitry that performs a calculation for image stabilization, based on the shake amount detected by the detector; and an image stabilizer that performs the image stabilization by translational movement and rotational movement within a predetermined movable range of the image sensor, based on a result of the calculation by the calculation circuitry. The calculation circuitry changes a first maximum amount and a second maximum amount within the movable range, according to a result of successively calculating a shake correction amount, the first maximum amount allowing a first movement that is one of the translational movement and the rotational movement, the second maximum amount allowing a second movement that is the other of the translational movement and the rotational movement.

An imaging apparatus in another aspect of the present disclosure includes: an image sensor that captures a subject image via an optical system; a detector that detects a shake amount of the imaging apparatus; an image stabilizer that performs first image stabilization using multiple movements within a predetermined movable range, based on the shake amount detected by the detector; and a controller that controls a proportion set between the first image stabilization, which is performed by the image stabilizer, and second image stabilization performed in the optical system. A first maximum amount and a second maximum amount are changed within the movable range, according to a result of successively calculating a shake correction amount, the first maximum amount allowing a first movement that is one of the multiple movements, the second maximum amount allowing a second movement that is the other of the multiple movements. The controller changes the proportion between the first and second image stabilizations, when the first and the second maximum amounts are changed according to the calculated shake correction amount.

The imaging apparatus according to the present disclosure is possible to effectively utilize a range within which the imaging apparatus is capable of correcting various camera shake.

BRIEF DESCRIPTION OF DRAWINGS

FIGS. 5A to 5C are views for explaining a typical correction range in the digital camera;

DETAILED DESCRIPTION

Hereinafter, embodiments of the present disclosure will be described with appropriate reference to the drawings.

However, in the detailed description, unnecessary portions of the descriptions about the prior art and substantially identical structures may be omitted. This is for simplification of the description. Further, the following description and the accompanying drawings are disclosed in order to enable those skilled in the art to sufficiently understand the present disclosure and are not intended to limit the subject matter of the claims.

First Embodiment

In a first embodiment, there will be described an example of a lens-interchangeable digital camera having an image stabilization function, as an example of an imaging apparatus.

1. Configuration

Figure 1:
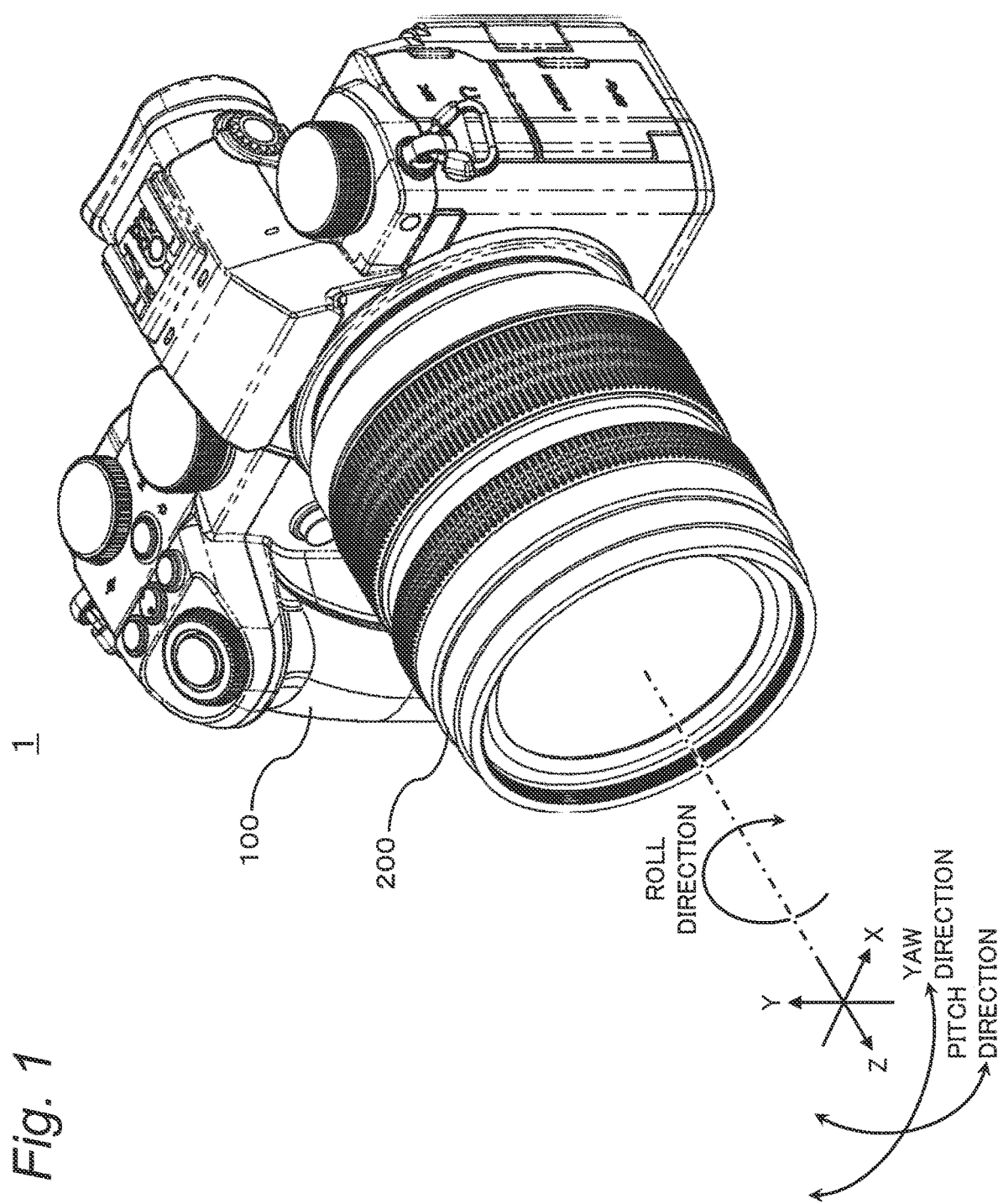
FIG. 1 is a perspective view of a digital camera according to a first embodiment of the present disclosure.
Figure 2:
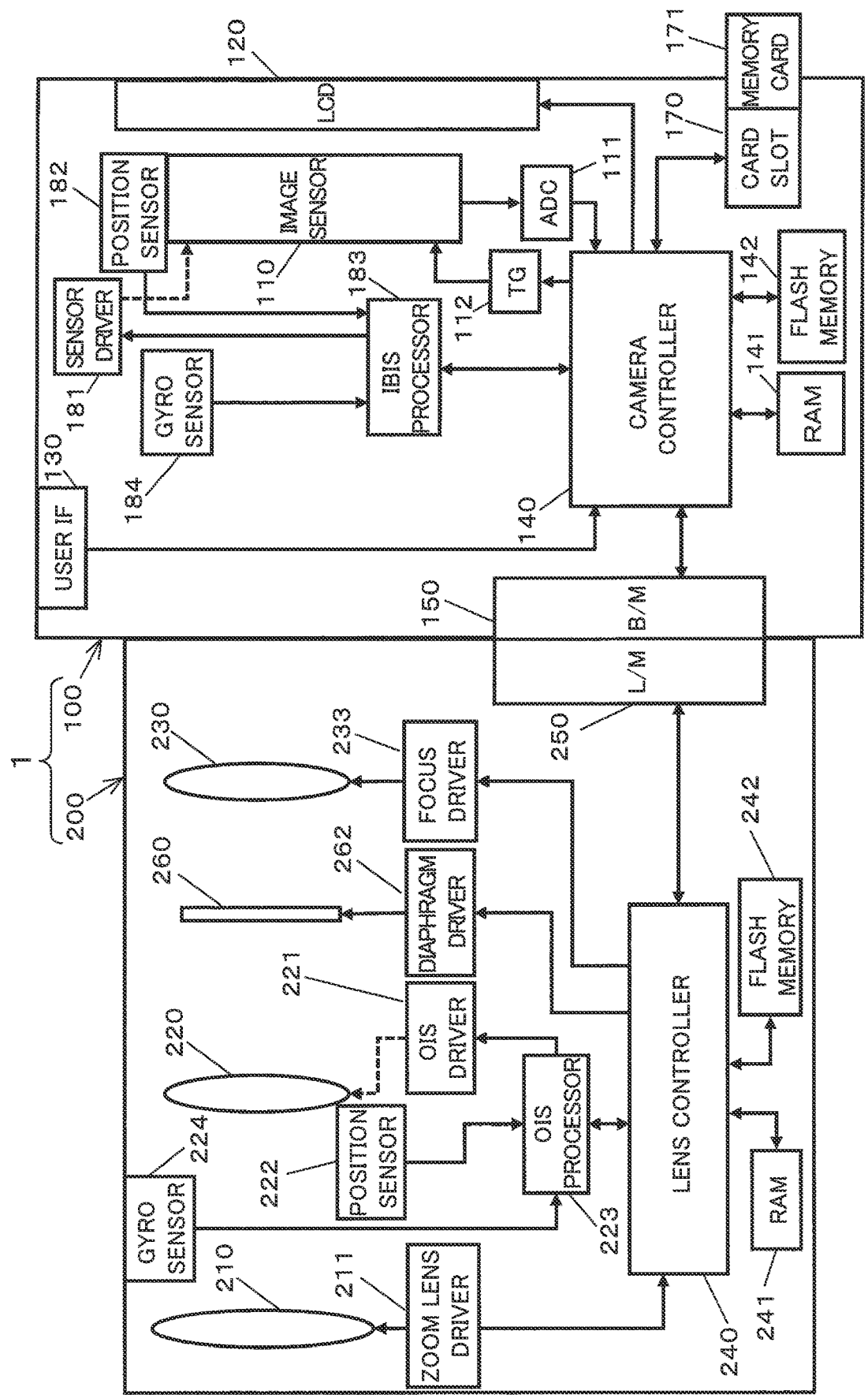
FIG. 2 is a block diagram illustrating the structure of the digital camera according to the first embodiment.

FIG. 1 is a perspective view of a digital camera 1 according to the first embodiment. FIG. 2 is a block diagram illustrating the structure of the digital camera 1 according to the first embodiment. The digital camera 1 includes a camera body 100, and an interchangeable lens 200 attachable to and detachable from the camera body 100. In the following description, a function of moving an image sensor in the camera body 100 for correcting shakes will be referred to as a "in-body image stabilizer (IBIS) function". Further, a function of moving a correction lens in the interchangeable lens 200 for correcting shakes will be referred to as an "optical image stabilizer (OIS) function".

In the following description, the direction about an X axis corresponding to a horizontal direction of the digital camera 1 (i.e., a tilt direction) will be defined as a pitch direction, and the direction about a Y axis corresponding to a vertical direction (i.e., a pan direction) will be defined as a yaw direction (see FIG. 1). Further, the direction of rotation of the image pickup surface of the image sensor in the digital camera 1 in a plane orthogonal to the optical axis (the direction about a Z axis) will be defined as a roll direction (see FIG. 1).

1-1. Camera Body

The camera body 100 (an example of the imaging apparatus) includes an image sensor 110, a liquid crystal monitor 120, a user interface 130, a camera controller 140, a body mount 150, and a card slot 170.

The camera controller 140 controls the operation of the entire digital camera 1 by controlling constituents, such as the image sensor 110, according to instructions from a release button. The camera controller 140 transmits a vertical synchronization signal to a timing generator 112. In parallel with this, the camera controller 140 generates an exposure synchronization signal. The camera controller 140 periodically transmits the generated exposure synchronization signal to a lens controller 240 via the body mount 150 and a lens mount 250. The camera controller 140 uses a RAM 141 as a work memory, during control operations and image processing operations.

The image sensor 110 is an example of the image sensor for capturing a subject image incident thereto via the interchangeable lens 200 and creating image data. The image sensor 110 is constituted by, for example, a CCD, a CMOS image sensor, or an NMOS image sensor. The created image data is digitized by an analog-to-digital (AD) converter 111. The digitized image data is subjected to predetermined image processing by the camera controller 140. The predetermined image processing is, for example, gamma correction processing, white balance correction processing, scratch correction processing, YC conversion processing, electronic zoom processing, and JPEG compression processing.

The image sensor 110 operates at timing controlled by the timing generator 112. The image sensor 110 creates a still image or a moving image to be recorded, or a through image (i.e., a live-view image). Such a through image, which is mainly a moving image, is displayed on the liquid crystal monitor 120 in order to enable a user to determine a composition for capturing a still image.

The liquid crystal monitor 120 displays an image such as a through image, and various information such as a menu screen. The liquid crystal monitor 120 is an example of a display according to the present embodiment. It is also possible to use other types of display devices, such as an organic light-emitting (EL) display device, for example, instead of the liquid crystal monitor.

The user interface 130 includes various manipulating members, such as the release button for instructing the start of shooting, a mode dial for setting shooting modes, and a power-supply switch. The user interface 130 also includes a touch panel disposed in such a way as to be stacked on the liquid crystal monitor 120.

The card slot 170 enables a memory card 171 to be mounted therein. The card slot 170 controls the memory card 171 based on control by the camera controller 140. The digital camera 1 can store image data in the memory card 171 and can read image data from the memory card 171.

The body mount 150 is mechanically and electrically connectable to the lens mount 250 in the interchangeable lens 200. The body mount 150 is an example of a communication interface in the camera body 100, wherein the communication interface is capable of transmitting and receiving data to and from the interchangeable lens 200 via the lens mount 250. The body mount 150 receives an exposure synchronization signal from the camera controller 140 and transmits it to the lens controller 240 via the lens mount 250. Further, the body mount 150 receives other control signals from the camera controller 140 and transmits them to the lens controller 240 via the lens mount 250. Further, the body mount 150 receives signals from the lens controller 240 via the lens mount 250 and transmits them to the camera controller 140.

The camera body 100 further includes a gyro sensor 184 (a shake sensor, i.e., detector) for detecting shakes of the camera body 100, and an IBIS processor 183 for controlling shake correction processing based on the result of detection by the gyro sensor 184, as structures for realizing the IBIS function. The camera body 100 further includes a sensor driver 181 for moving the image sensor 110, and a position sensor 182 for detecting the position of the image sensor 110.

The sensor driver 181 can be realized by a magnet and a flat plate coil, for example. The sensor driver 181 may also include other constituents such as a motor or an actuator. The position sensor 182 is a sensor for detecting the position of the image sensor 110 in a plane perpendicular to the optical axis of an optical system. The position sensor 182 can be realized by a magnet and a Hall element, for example.

The IBIS processor 183 controls the sensor driver 181 based on a signal from the gyro sensor 184 and a signal from the position sensor 182 for translating and rotating the image sensor 110 into a plane perpendicular to the optical axis, in such a way as to cancel out shakes of the camera body 100. There is a mechanical limit to the range within which the image sensor 110 can be driven by the sensor driver 181. The range within which the image sensor 110 can be driven by the sensor driver 181 with the IBIS function will be referred to as a "sensor movable range".

1-2. Interchangeable Lens

The interchangeable lens 200 includes the optical system, the lens controller 240, and the lens mount 250. The optical system includes a zoom lens 210, an optical image stabilizer (OIS) lens 220, a focus lens 230, and a diaphragm 260.

The zoom lens 210 is a lens for changing the magnification of a subject image formed by the optical system. The zoom lens 210 is constituted by one or more lenses. The zoom lens 210 is driven by a zoom driver 211. The zoom driver 211 includes a zoom ring which can be manipulated by the user. Alternatively, the zoom driver 211 may include a zoom lever, and an actuator or a motor. The zoom driver 211 moves the zoom lens 210 in the direction of the optical axis of the optical system, according to manipulations by the user.

The focus lens 230 is a lens for changing the focus state of a subject image formed on the image sensor 110 in the optical system. The focus lens 230 is constituted by one or more lenses. The focus lens 230 is driven by a focus driver 233.

The focus driver 233 includes an actuator or a motor, and moves the focus lens 230 along the optical axis of the optical system, based on control by the lens controller 240. The focus driver 233 can be realized by a DC motor, a stepping motor, a servo motor, an ultrasonic motor, or the like.

The OIS lens 220 is a lens for correcting shakes of a subject image formed by the optical system in the interchangeable lens 200 in the OIS function, namely an example of a correction lens. The OIS lens 220 moves in such a direction as to cancel out shakes of the digital camera 1 to reduce shakes of the subject image on the image sensor 110. The OIS lens 220 is constituted by one or more lenses. The OIS lens 220 is driven by an OIS driver 221.

The OIS driver 221 shifts the OIS lens 220 in a plane perpendicular to the optical axis of the optical system, under the control of an OIS processor 223. There is a mechanical limit to the range within which the OIS lens 220 can be driven by the OIS driver 221. The range within which the OIS lens 220 can be driven by the OIS driver 221 will be referred to as a "lens movable range". The OIS driver 221 can be realized by a magnet and a flat plate coil, for example. A position sensor 222 is a sensor for detecting the position of the OIS lens 220 in a plane perpendicular to the optical axis of the optical system. The position sensor 222 can be realized by a magnet and a Hall element, for example. The OIS processor 223 controls the OIS driver 221 based on an output from the position sensor 222 and an output from a gyro sensor 224 (a shake sensor, i.e., detector).

The lens mount 250 is an example of a communication interface in the interchangeable lens 200, wherein the communication interface is capable of transmitting and receiving data to and from the camera body 100 via the body mount 150.

The diaphragm 260 adjusts the amount of light incident onto the image sensor 110. A diaphragm driver 262 drives the diaphragm 260 to control the size of the aperture of the diaphragm 260. The diaphragm driver 262 includes a motor or an actuator.

The gyro sensor 184 or 224 detects a shake (vibration) in one or more directions out of the yaw direction, the pitch direction, and the roll direction, for example, based on an angular change of the digital camera 1 per unit time, namely an angular velocity thereof. The gyro sensor 184 or 224 outputs an angular velocity signal indicating the detected amount of shake (the angular velocity), to the IBIS processor 183 or the OIS processor 223. The angular velocity signal outputted from the gyro sensor 184 or 224 may include a wide range of frequency components caused by camera shakes, mechanical noises, and the like. It is also possible to employ other sensors capable of detecting shakes of the digital camera 1, instead of the gyro sensors.

The camera controller 140 and the lens controller 240 may be constituted by a hard-wired electronic circuit or by a microcomputer using programs. For example, the camera controller 140 and the lens controller 240 may be realized by various processors, such as a central processing unit (CPU), an microprocessor (MPU), a graphics processing unit (GPU), a digital signal processor (DSP), a field-programmable gate array (FPGA), or an application specific integrated circuit (ASIC).

1-3. IBIS Processor

Figure 3:
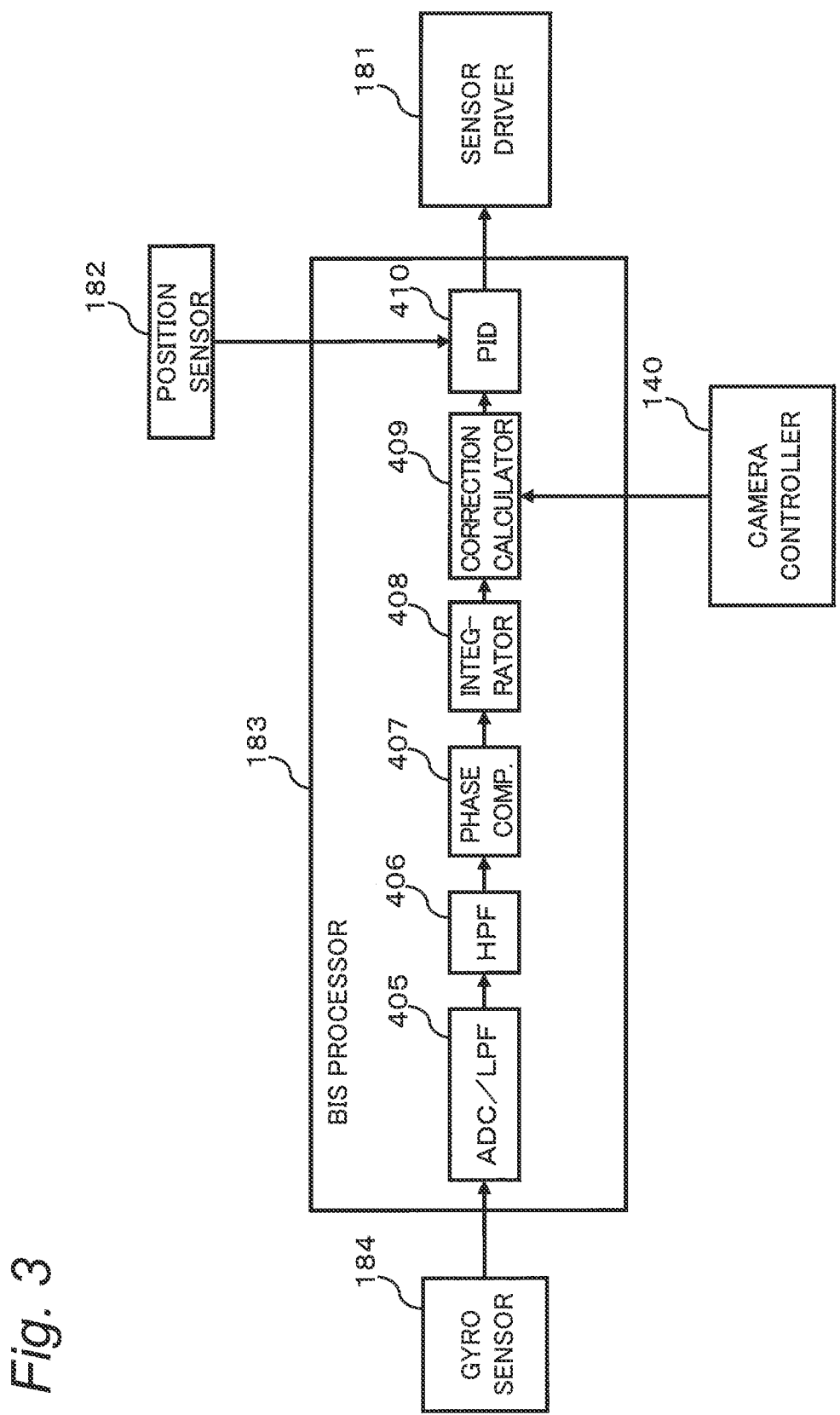
FIG. 3 is a block diagram illustrating the structure of an IBIS processor in the digital camera.

The structure of the IBIS processor 183 in the camera body 100 will be described, with reference to FIG. 3. The IBIS processor 183 includes an analog-to-digital converter (ADC)/low-pass filter (LPF) 405, a high-pass filter (HPF) 406, a phase compensator 407, an integrator 408, a correction calculator 409, and a PID controller 410.

The ADC/LPF 405 converts an angular velocity signal from the gyro sensor 184 from an analog format into a digital format. Further, the ADC/LPF 405 cuts off high frequency components of the angular velocity signal in the digital format having been resulted from the conversion, in order to remove noises and extract only a shake of the digital camera 1. Shakes of the hand of the shooting person have low frequencies of about 1 to 10 Hz. In consideration of this fact, the cutoff frequency of the LPF is determined. In cases where noises are not problematic, the function of the LPF can be omitted.

The HPF 406 cuts off predetermined low frequency components contained in the signal received from the ADC/LPF 405, in order to cut off drift components.

The phase compensator 407 corrects a phase lag in the signal received from the HPF 406, wherein such a phase lag is caused by the sensor driver 181 and the like.

The integrator 408 integrates the signal indicating the angular velocity of the shake (vibration), which was inputted from the phase compensator 407, to generate a signal indicating an angle of the shake (vibration) (which will be referred to as a "shake detection signal", hereinafter). The shake detection signal from the integrator 408 is inputted to the correction calculator 409.

Various information such as a focal length are further inputted from the camera controller 140, for example, to the correction calculator 409. Based on inputted various information, the correction calculator 409 calculates a shake correction amount for correcting the shake amount indicated by the shake detection signal and, further, calculates a maximum movement amount (e.g., a maximum translation amount and a maximum rotation amount which will be described later) by which the sensor driver 181 can move to a maximum extent. The correction calculator 409 outputs the results of such calculations to the PID controller 410.

The PID controller 410 generates a drive signal for moving the image sensor 110, based on an output from the position sensor 182 and the output from the correction calculator 409. Further, the PID controller 410 outputs the drive signal to the sensor driver 181.

The sensor driver 181 drives the image sensor 110 based on the drive signal. Specifically, the sensor driver 181 translationally moves the image sensor 110 in the horizontal direction or the vertical direction of the image pickup surface or rotationally moves the image sensor 110 about the direction of the optical axis as the rotational axis, within the sensor movable range.

The IBIS processor 183 is structured to be capable of performing data communication with the camera controller 140. For example, the IBIS processor 183 starts/ends an image stabilization operation, according to a control signal from the camera controller 140. Further, the IBIS processor 183 transmits various information about the image stabilization operation to the camera controller 140.

The OIS processor 223 can be structured similarly to the aforementioned IBIS processor 183, in such a way as to drive the OIS driver 221, instead of the sensor driver 181, for example. Furthermore, the OIS processor 223 operates, for example, using the result of detection by the gyro sensor 224 in the interchangeable lens 200, instead of the gyro sensor 184 in the camera body 100. The gyro sensor 224 in the interchangeable lens 200 is not required to detect shakes in the roll direction.

2. Operation

Hereinafter, there will be described image stabilizing operations of the digital camera 1 configured as described above.

2-1. Overall Operation

Figure 4:
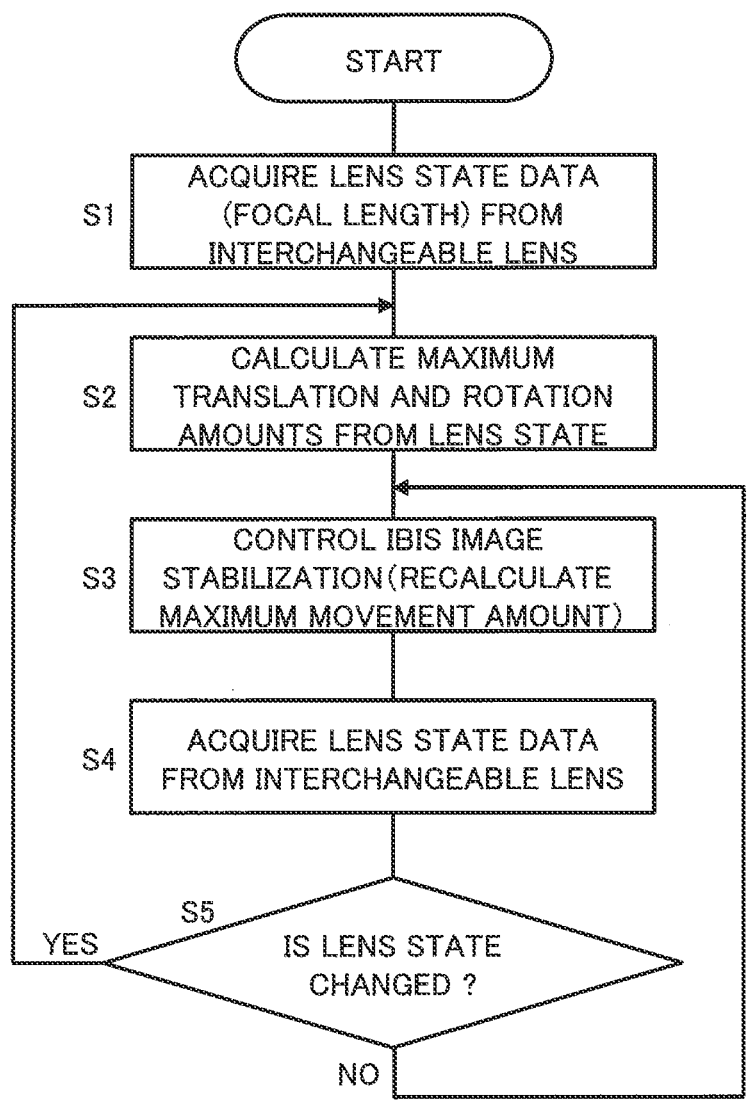
FIG. 4 is a flowchart illustrating overall operations for image stabilization in the digital camera according to the first embodiment.

There will be described overall operations relating to image stabilization in the digital camera 1 according to the present embodiment, with reference to FIG. 4. FIG. 4 is a flowchart illustrating overall operations for image stabilization in the digital camera 1 according to the first embodiment. Hereinafter, there will be described an example of operations in a case of using the IBIS function of the digital camera 1.

The processing illustrated in the flowchart of FIG. 4 is started in a state where the interchangeable lens 200 is attached to the camera body 100, for example. Each processing illustrated in the present flowchart is executed by the camera controller 140, for example, in parallel with operations for shooting a moving image and the like.

First, the camera controller 140 performs data communication with the lens controller 240 in the interchangeable lens 200 via the body mount 150 and the lens mount 250 to acquire lens state data (S1). For example, the lens state data includes a focal length corresponding to a zoom state of the interchangeable lens 200, an in-focus position corresponding to a focus state, and the like. The lens state data is stored in the RAM 241 in the interchangeable lens 200, for example. For example, the lens controller 240 reads the lens state data according to a request from the camera controller 140 and transmits the lens state data to the camera body 100.

For example, the camera controller 140 calculates a maximum translation amount and a maximum rotation amount within a correction range presumed typically for the IBIS function, from the lens state such as the focal length, based on the acquired lens state data (S2). FIGS. 5A to 5C are views for explaining a typical correction range 51 in the digital camera 1.

FIG. 5A illustrates a correction range 51 corresponding to an intermediate focal length, within the sensor movable range 50. FIG. 5B illustrates a correction range 51 at a telephoto side. FIG. 5C illustrates a correction range 51 at a wide-angle side. In FIGS. 5A to 5C, the horizontal axis represents the amount of translational movement caused by the sensor driver 181, and the vertical axis represents the amount of rotational movement.

For example, as illustrated in FIG. 5A, the correction range 51 is defined by the maximum translation amount Tm and the maximum rotation amount Rm within the sensor movable range 50. The maximum translation amount Tm is a maximum movement amount up to which the sensor driver 181 can translationally move the image sensor 110, in order to correct a camera shake with a translational component, such as a component in the pitch or yaw direction, for example. The maximum rotation amount Rm is a maximum movement amount up to which the sensor driver 181 can rotationally move the image sensor 110 in order to correct a camera shake with a rotational component, such as a component in the roll direction. For example, within the rectangular correction range 51, image stabilizations for a translational component and for a rotational component can be executed independently of each other, without interfering each other.

The digital camera 1 according to the present embodiment uses the sensor driver 181 for both a translational component and a rotational component, in image stabilization. Due to this mechanical constraint, as illustrated in FIGS. 5A to 5C, the sensor movable range 50 has such a relation between the maximum translation amount Tm and the maximum rotation amount Rm that, as one of them is larger, the other one is smaller. Furthermore, image stabilization for a translational component has such a characteristic that, as the focal length is longer, the amount of translational movement for correcting the same camera shake angle is larger.

Therefore, in step S2, for the correction range 51 at the telephoto side as illustrated in FIG. 5B, for example, the camera controller 140 sets the maximum translation amount Tm larger as the focal length is larger. Further, along therewith, the camera controller 140 sets the maximum rotation amount Rm smaller. On the other hand, for the correction range 51 at the wide-angle side as illustrated in FIG. 5C, the camera controller 140 sets the maximum translation amount Tm smaller as the focal length is smaller. Further, along therewith, the camera controller 140 sets the maximum rotation amount Rm larger. Accordingly, the digital camera 1 is enabled to prepare the typical correction range 51 from the lens state such as the focal length, before execution of image stabilization.

Returning to FIG. 4, the camera controller 140 outputs, to the IBIS processor 183, the maximum translation amount Tm and the maximum rotation amount Rm of the calculated correction range 51, the focal length, and the like, thereby controlling an image stabilizing operation by the IBIS processor 183, for example (S3).

The image stabilizing operation in step S3 is performed any time when the IBIS processor 183 detects a camera shake of the digital camera 1. In the digital camera 1 according to the present embodiment, the image stabilizing operation by the IBIS processor 183 is dynamically performed, while the maximum translation amount and the maximum rotation amount described above are recalculated, from the viewpoint of considering the real-time state of image stabilization. Such image stabilizing operations in the IBIS processor 183 will be described later.

During the execution of the image stabilizing operation (S3), for example, the camera controller 140 acquires the lens state data from the interchangeable lens 200 in a predetermined control cycle (S4). Further, the camera controller 140 determines whether or not the lens state is changed (S5). The control cycle is, for example, a cycle of communication between the camera body 100 and the interchangeable lens 200 in the digital camera 1 (or a frame period for shooting a moving image). For example, the control cycle is 1/60 to 1/30 seconds.

For example, when the user of the digital camera 1 performs a zooming manipulation or a focusing manipulation for the interchangeable lens 200, this may change the lens state. The determination in step S5 is performed by being targeted for the change of the focal length of the interchangeable lens 200, for example. The target of the determination in step S5 may also include the change of the focus position, and the like.

When it is determined that the lens state is changed (YES in S5), for example, the camera controller 140 calculates, again, the maximum translation amount Tm and the maximum rotation amount Rm within the typical correction range 51, based on the new focal length in the changed lens state (S2). Further, the camera controller 140 performs the processing in and after step S3 again. On the other hand, when it is determined that the lens state is not changed (NO in S5), the camera controller 140 returns to step S3 without performing the processing in the aforementioned step S2 again.

The camera controller 140 repeatedly performs the aforementioned processing in the aforementioned predetermined control cycle, for example.

According to the aforementioned processing, for example, when the lens state such as the focal length is changed in the digital camera 1 (YES in S5), the camera controller 140 changes the maximum translation amount Tm and the maximum rotation amount Rm in the typical correction range 51, according to the changed lens state (S2). Accordingly, image stabilizing operations can be executed by reflecting the lens state within the typical correction range 51, with the IBIS function of the digital camera 1.

In the aforementioned description, there has been described an example where the camera controller 140 calculates the maximum movement amount (which is a generic term for the maximum translation amount and the maximum rotation amount), based on the focal length and the like, in step S2. In the digital camera 1 according to the present embodiment, the camera controller 140 is not necessarily required to calculate the maximum movement amount, and step S2 may be omitted. The IBIS processor 183 may calculate the maximum movement amount based on the focal length and the like, similarly to in step S2.

2-1-1. Problems for Effective Use of Sensor Movable Range

A conventional method for controlling image stabilization using a typical correction range 51 as described above may be a method for limiting image stabilizing operations to only within the correction range 51 set as in step S2, for example. However, such a typical control method does not reflect the state of image stabilization being actually executed. Therefore, there is room for improvement in effective use of the sensor movable range 50. This will be described with reference to FIG. 6.

Figure 6:
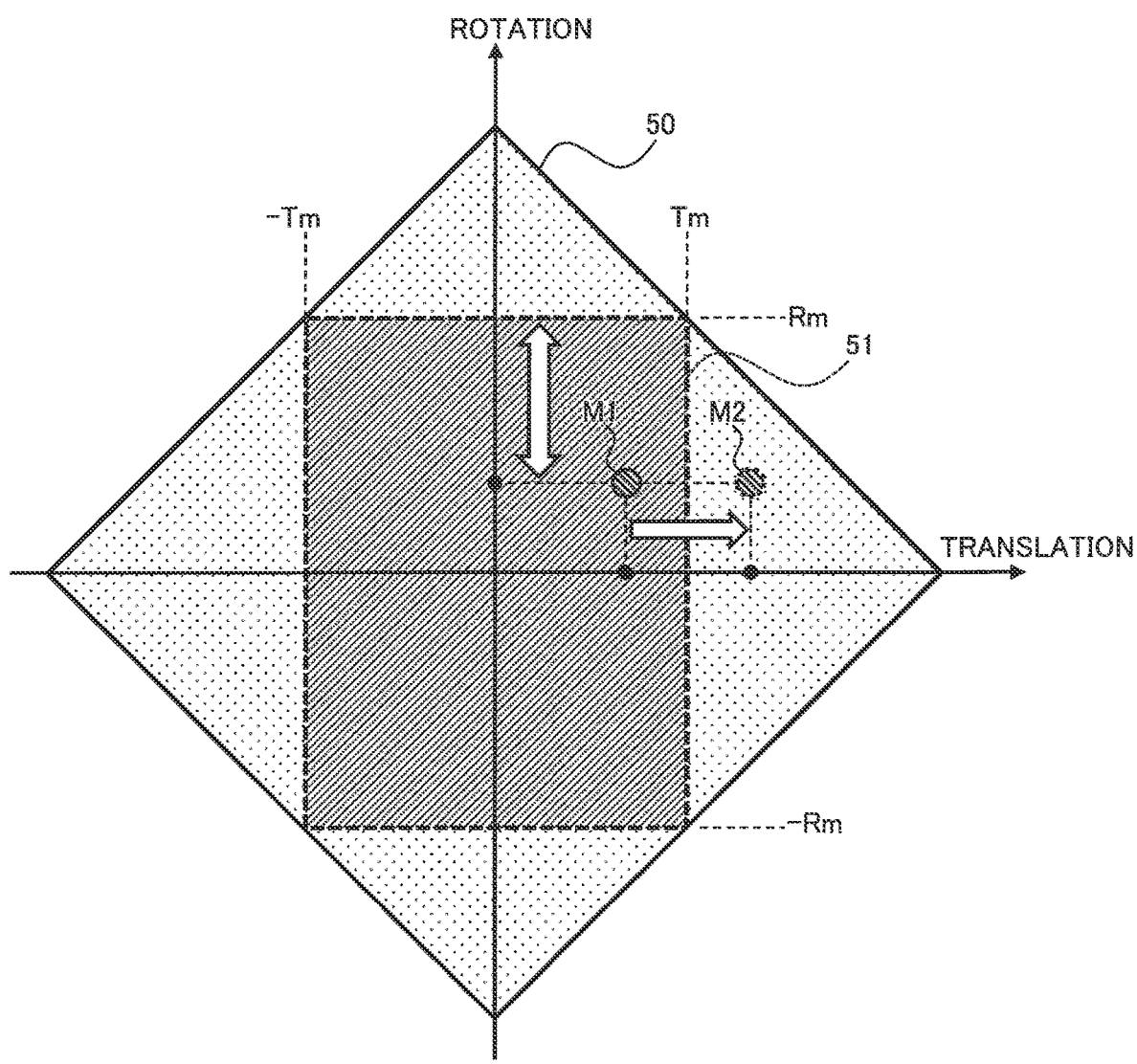
FIG. 6 is a view for explaining effective use of a sensor movable range in the digital camera.

FIG. 6 is a view for explaining effective use of the sensor movable range 50 in the digital camera 1. FIG. 6 illustrates a shake correction amount M1 indicating an example of an image stabilization state within a preset correction range 51, and a shake correction amount M2 outside the correction range 51 but within the sensor movable range 50. The shake correction amounts M1 and M2 are movement amounts by which the sensor driver 181 should move the image sensor 110 for performing image stabilization.

In the example of FIG. 6, the shake correction amount M2 outside the typical correction range 51 has a rotational component smaller than maximum rotation amount Rm by a margin, similarly to the shake correction amount M1 which is within the correction range 51. Further, the shake correction amount M2 is within the sensor movable range 50 for the sensor driver 181 capable of executing image stabilization. Nevertheless, with the aforementioned typical control method, the image stabilization is limited to within the correction range 51 determined preliminarily on the basis of the lens state and the like. This makes it difficult to realize image stabilization for the shake correction amount M2 having a translational component exceeding the maximum translation amount in the correction range 51. As described above, the aforementioned typical control method has room for improvement, in terms of having difficulty in effectively using the portion of the sensor movable range 50 outside the aforementioned set correction range 51.

For coping therewith, the digital camera 1 according to the present embodiment successively recalculates, in the IBIS processor 183, a maximum movement amount up to which the sensor driver 181 can be used, according to the image stabilization state such as the magnitudes of respective components in the shake correction amounts M1 and M2. For example, in the example of FIG. 6, the maximum translation amount Tin of the sensor driver 181 can be increased according to the margins for the rotational components in the shake correction amounts M1 and M2, thereby obtaining a range within which the translational components can be corrected. In this way, the digital camera 1 according to the present embodiment can realize image stabilization for the shake correction amount M2, which is difficult to realize by the typical control method. This facilitates effectively and fully using the sensor movable range 50. Hereinafter, operations of the digital camera 1 as described above will be described in detail.

2-2. Details of Operation

Figure 7:
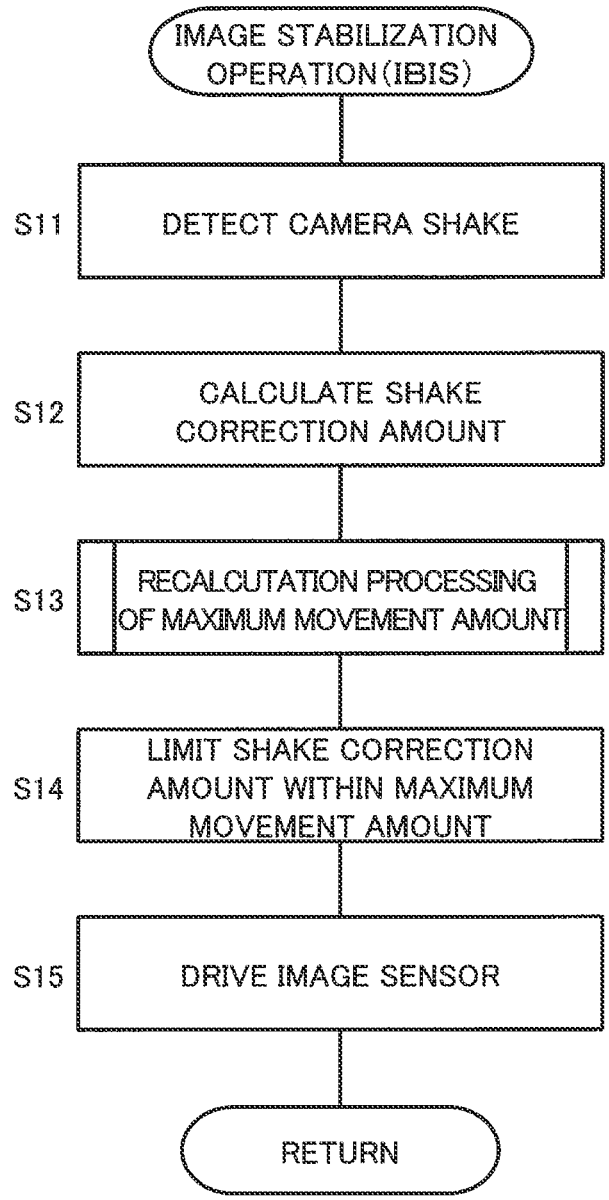
FIG. 7 is a flowchart illustrating image stabilizing operations with the IBIS function in the digital camera according to the first embodiment.

There will be described image stabilizing operations of the IBIS processor 183 in the digital camera 1 according to the present embodiment, with reference to FIG. 7. FIG. 7 is a flowchart illustrating image stabilizing operations with the IBIS function in the digital camera 1 according to the first embodiment.

The processing illustrated in the flowchart of FIG. 7 is repeatedly executed in a predetermined operation cycle by the IBIS processor 183 in the digital camera 1, for example. For example, the cycle of operations of the IBIS processor 183 is smaller than the control cycle of FIG. 4, and is e.g. one several thousandth of a second. This flow is executed a plurality of times corresponding to step S3 in FIG. 4, for example.

First, the IBIS processor 183 receives an input of an angular velocity signal from the gyro sensor 184 to detect a shake amount indicating a camera shake of the digital camera 1, for example (S11). For example, the gyro sensor 184 detects angular velocities in the pitch, yaw, and roll directions, respectively, to output the results of the respective detections as an angular velocity signal to the IBIS processor 183.

Next, based on the result of detection of the camera shake, the IBIS processor 183 calculates a shake correction amount as a movement amount by which the sensor driver 181 should move the image sensor 110 for cancelling the camera shake angle, for example (S12).

For example, the IBIS processor 183 (FIG. 3) performs signal processing on the angular velocity signal from the gyro sensor 184 by the ADC/LPF 405, the HPF 406, and the phase compensator 407 and, the outcome is integrated by the integrator 408 to calculate the camera shake angle. Further, with the correction calculator 409 for example, the IBIS processor 183 calculates a shake correction amount by converting the correction angle which cancels the calculated camera shake angle into a movement amount of the sensor driver 181, using the focal length (S3 in FIG. 4) inputted from the camera controller 140 (S12).

Next, with the correction calculator 409 for example, the IBIS processor 183 according to the present embodiment calculates a maximum movement amount such as a maximum translation amount and a maximum rotation amount, to reflect the current image stabilization state, based on the calculated shake correction amount (S13). The recalculation processing of the maximum movement amount (S13) according to the present embodiment calculates the maximum movement amount, to preferentially correct one of a translational component and a rotational component in the image stabilization. The processing in step S13 will be described later in detail.

Next, the IBIS processor 183 limits the calculated shake correction amount to within a range not exceeding the maximum movement amount obtained as described above by the correction calculator 409, for example (S14).

Based on the shake correction amount limited as described above, the IBIS processor 183 drives the image sensor 110 by the shake correction amount, through the control of the sensor driver 181 by the PID controller 410, for example (S15). The PID controller 410 generates a drive signal instructing translation and rotation of the image sensor 110 by an amount necessary for the image stabilization, based on the limited shake correction amount and the output from the position sensor 182. Further, the PID controller 410 outputs the drive signal to the sensor driver 181. The sensor driver 181 moves the image sensor 110 according to the drive signal, thereby performing image stabilization.

The IBIS processor 183 repeats the aforementioned processing in steps S11 to S15 in every predetermined operation cycle.

With the aforementioned processing, the IBIS processor 183 can execute image stabilizing operations with the IBIS function, while dynamically calculating a maximum movement amount in such a way as to reflect the state of the image stabilization being executed. This facilitates effective use of the sensor movable range 50.

2-2-1. Recalculation Processing of Maximum Movement Amount

The recalculation processing of a maximum movement amount in step S13 in FIG. 7 will be described, with reference to FIGS. 8 to 12.

Figure 8:
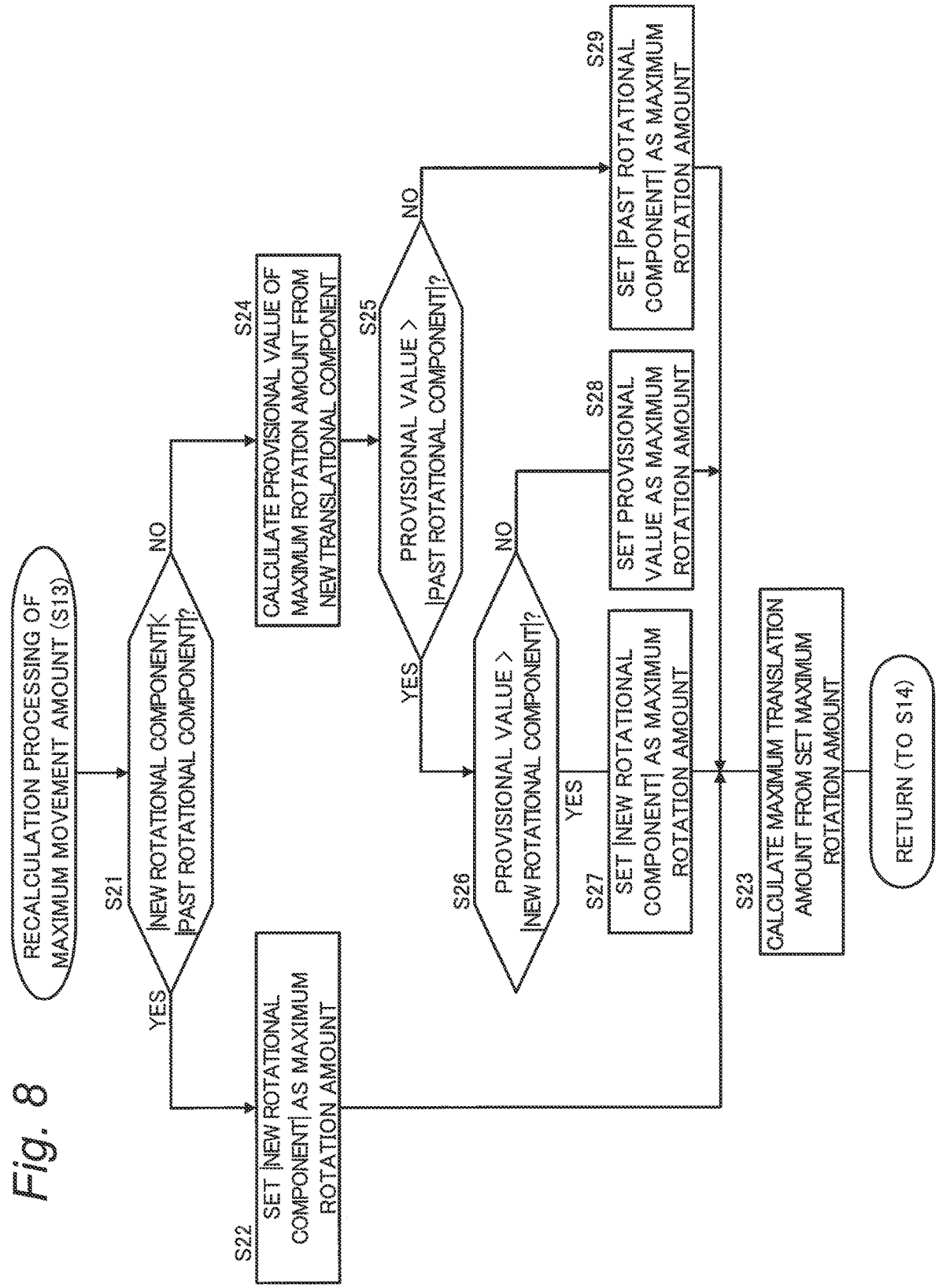
FIG. 8 is a flowchart illustrating recalculation processing of a maximum movement amount in the digital camera according to the first embodiment.

FIG. 8 is a flowchart illustrating the recalculation processing of a maximum movement amount (S13) in the digital camera 1 according to the present embodiment. Hereinafter, there will be described an example of operations for performing image stabilization for a translational component in preference to image stabilization for a rotational component.

Figure 9:
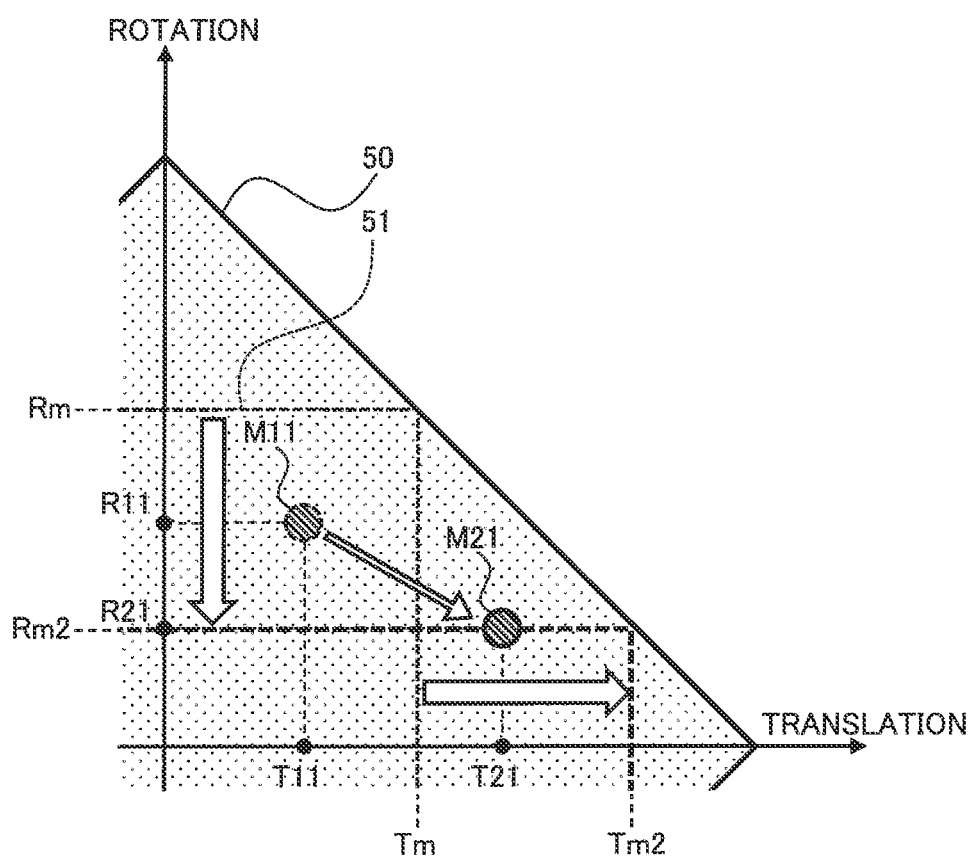
FIG. 9 is a view illustrating an example of an image stabilization state in a case where a camera shake decreases in a roll direction.

First, based on the shake correction amount calculated in step S12 in FIG. 7, the IBIS processor 183 determines, for example, whether or not the magnitude (i.e., the absolute value) of a rotational component in the new image stabilization state is smaller than the magnitude of a rotational component in the previous image stabilization state (S21). In step S21, the digital camera 1 detects the presence or absence of reduction in camera shake in the roll direction, during the execution of the image stabilizing operation. FIG. 9 illustrates a case where the camera shake reduces in the roll direction (YES in S21).

FIG. 9 illustrates a new shake correction amount M21 and a past shake correction amount M11 to be compared with each other in step S21. For example, the new shake correction amount M21 indicates the image stabilization state calculated in step S12 which is in the latest cycle of operations by the IBIS processor 183. For example, the past shake correction amount M11 indicates the image stabilization state calculated in step S12 which is in the previous cycle of operations. The past shake correction amount M11 may be a result of executing the calculation in step S12 one or plural times in and before the previous cycle of operations. For example, the past shake correction amount M11 may be an average value of the results of executing the calculation in step S12 a predetermined number of times in the past, for example.

When the IBIS processor 183 determines that the magnitude of the rotational component R21 of the new shake correction amount M21 is smaller than the magnitude of the rotational component R11 of the past shake correction amount M11 (YES in S21) as the example illustrated in FIG. 9, the IBIS processor 183 sets the magnitude of the rotational component R21 of the new shake correction amount M21 as a maximum rotation amount Rm2 resulted from the recalculation (S22).

Further, based on the maximum rotation amount Rm2 set as the result of recalculation, the IBIS processor 183 calculates a maximum translation amount Tm2 as the result of recalculation (S23). For example, the IBIS processor 183 calculates a maximum translation amount for an X component corresponding to the yaw direction, and a maximum translation amount for a Y component corresponding to the pitch direction, by substituting the set maximum rotation amount Rm2 into a predetermined arithmetic formula indicating the sensor movable range 50. The predetermined arithmetic formula is defined so as to linearly approximate the sensor movable range 50, for example, and is stored in the flash memory 142 or the like.

For example, in the example of FIG. 9, as the rotational component R21 of the new shake correction amount M21 has reduced from the rotational component R11 of the past shake correction amount M11 (YES in S21), the IBIS processor 183 decreases the maximum rotation amount Rm2 as the result of recalculation (S22). Further, by an amount corresponding to the decrease of the maximum rotation amount, the IBIS processor 183 increases the maximum translation amount Tm2 (S23). This can expand the range within which the translational component T21 can be corrected, along with the decrease of the rotational component R21 in the camera shake state.

Figure 10:
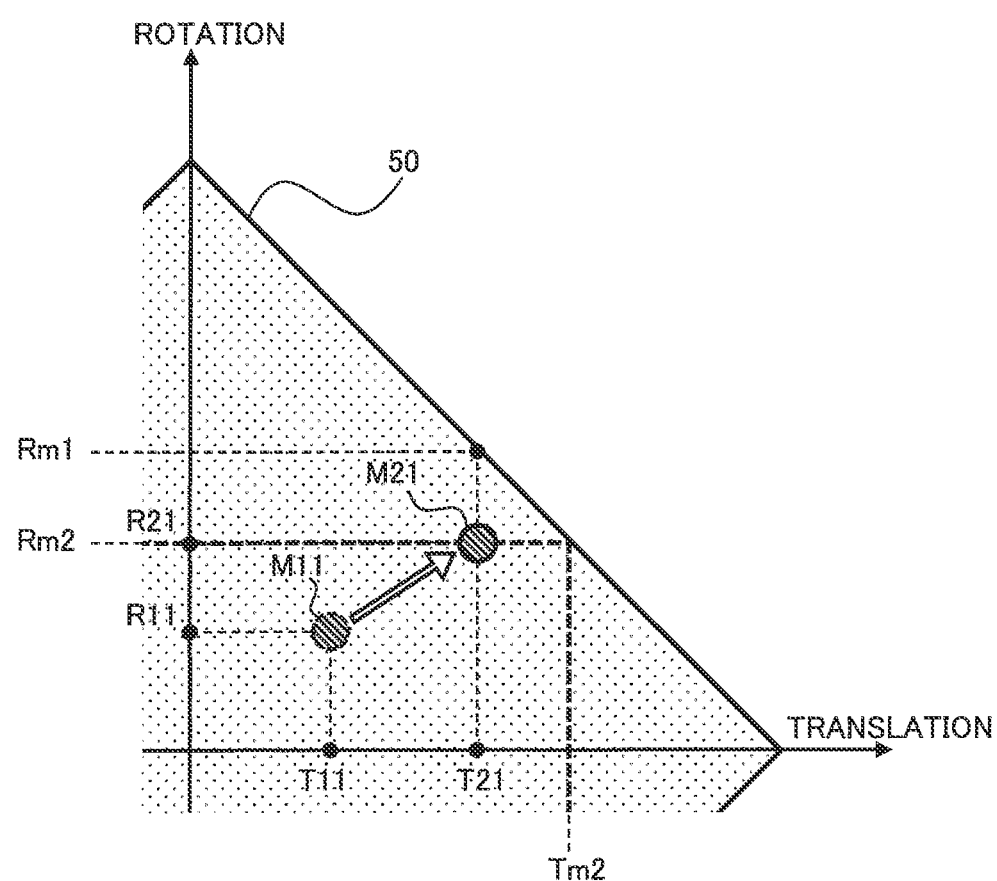
FIG. 10 is a view illustrating an example of an image stabilization state in a case where a camera shake does not decrease in the roll direction.

FIG. 10 illustrates an example of a case where the camera shake has no decrease in the roll direction (NO in S21). For example, when the IBIS processor 183 determines that the magnitude of the rotational component R21 of the new shake correction amount M21 is not smaller than the magnitude of the rotational component R11 of the past shake correction amount M11 (NO in S21), the IBIS processor 183 calculates a maximum rotation amount Rm1 having a provisional value being recalculated, based on the translational component T21 of the new shake correction amount M21 (S24).

For example, in step S24, the IBIS processor 183 calculates a maximum rotation amount from the X component in the translational component T21 of the new shake correction amount M21, and calculates a maximum rotation amount from the Y component in the same translational component, using the same arithmetic formula as that in step S23. Further, the IBIS processor 183 adopts the smaller one of both the calculated maximum rotation amounts, as the maximum rotation amount Rm1 having a provisional value in step S24.

Next, the IBIS processor 183 determines whether or not the maximum rotation amount Rm1 having the calculated provisional value is larger than the magnitude of the rotational component R11 of the past shake correction amount M11 (S25). For example, in the example of FIG. 10, the determination in step S25 results in "YES". The determination in step S25 can result in "NO", when an excessive camera shake occurs in a direction other than the roll direction after correcting a camera shake in the roll direction (see FIG. 12).

When the IBIS processor 183 determines that the maximum rotation amount Rm1 having the calculated provisional value is larger than the magnitude of the rotational component R11 of the past shake correction amount M11 (YES in S25), as the example illustrated in FIG. 10, the IBIS processor 183 determines whether or not this maximum rotation amount Rm1 is larger than the magnitude of the rotational component R21 of the new shake correction amount M21 (S26). For example, in the example of FIG. 10, the determination in step S26 results in "YES". The determination in step S26 can result in "NO", when the new camera shake is excessively large in the roll direction (see FIG. 11).

When the IBIS processor 183 determines that the maximum rotation amount Rm1 having the calculated provisional value is larger than the magnitude of the rotational component R21 of the new shake correction amount M21 (YES in S26), as the example illustrated in FIG. 10, the IBIS processor 183 sets the magnitude of the rotational component R21 of the new shake correction amount M21 as a maximum rotation amount Rm2 resulted from recalculation (S27).

For example, in the example of FIG. 10, the IBIS processor 183 sets the maximum rotation amount Rm2 as the result of the recalculation at a minimum value which can correct the rotational component R21 of the new shake correction amount M21 (S27). Further, along therewith, the IBIS processor 183 sets the maximum translation amount Tm2 at a maximum value within the sensor movable range 50 (S23). This enables securing a range within which the translational component T21 can be corrected, by not excessively increasing the maximum rotation amount Rm2 for coping with the increase of a camera shake in the roll direction.

Figure 11:
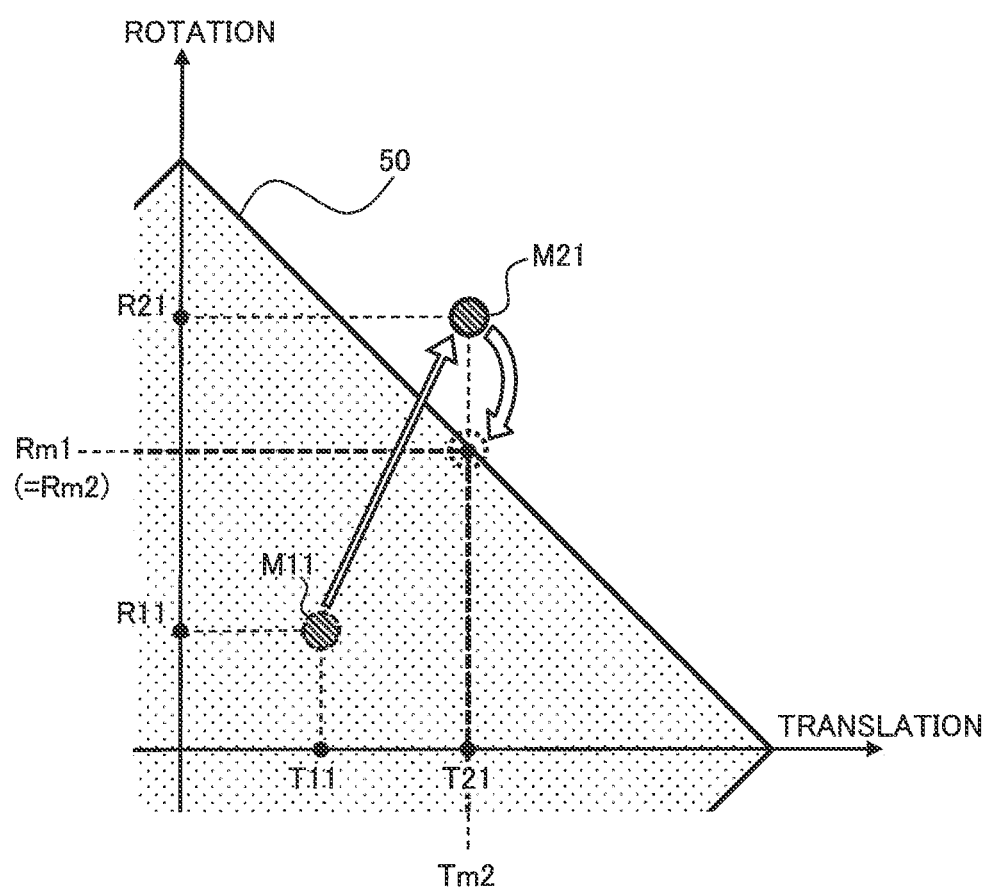
FIG. 11 is a view illustrating an example of an image stabilization state in a case where a camera shake is excessively large in the roll direction.

FIG. 11 exemplifies a case where the camera shake is excessively large magnitude in the roll direction (NO in S26). In this example, the new shake correction amount M21 has a rotational component R21 exceeding the maximum rotation amount Rm1 having the provisional value calculated from the translational component T21 thereof, and reaching the outside of the sensor movable range 50.

When the IBIS processor 183 determines that the provisional value of the maximum rotation amount Rm having the provisional value is not larger than the magnitude of the rotational component R21 of the new shake correction amount M21 (NO in S26), as the example illustrated in FIG. 11, the IBIS processor 183 sets the maximum rotation amount Rm1 having the provisional value as the maximum rotation amount Rm2 resulted from the recalculation (S28). Thus, when the rotational component R21 is excessively large, the maximum rotation amount Rm2 as the result of recalculation is limited to within the sensor movable range 50.

Further, based on the maximum rotation amount Rm2 limited as described above, the IBIS processor 183 calculates a corresponding maximum translation amount Tm2 within the sensor movable range 50 (S23). This enables correcting a camera shake having an excessive rotational component R21 to within the sensor movable range 50, with correcting a camera shake with a translational component T21 to a maximum extent within this range.

Figure 12:
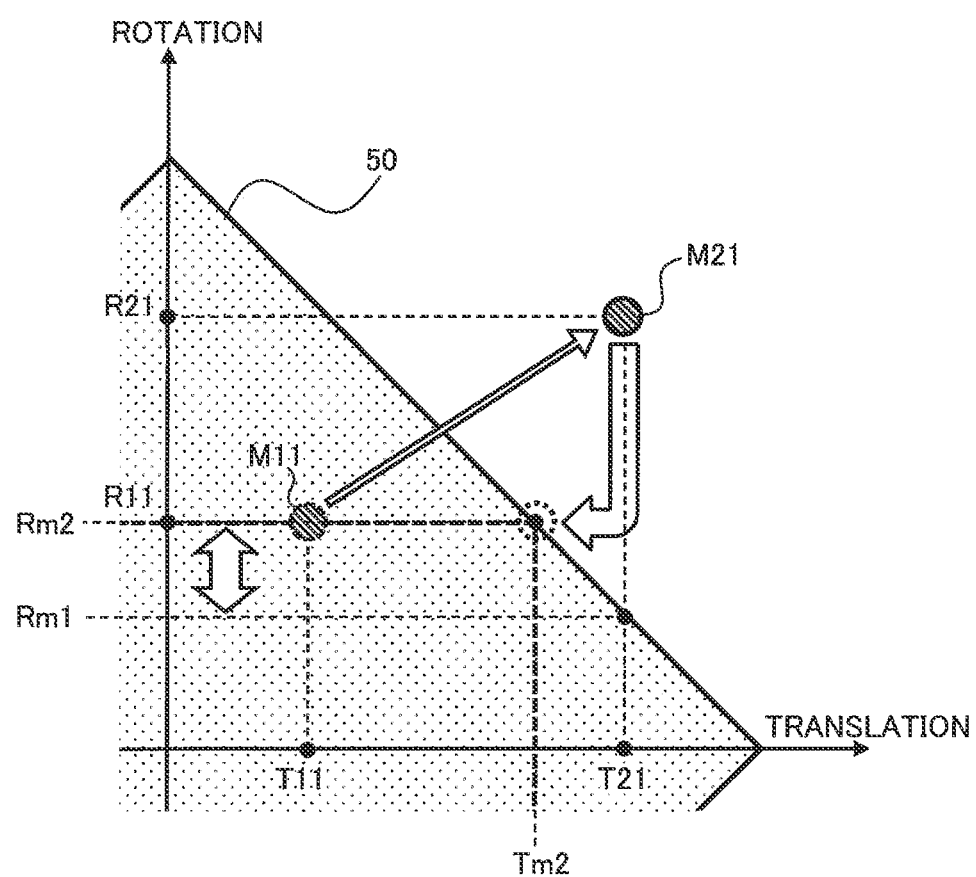
FIG. 12 is a view illustrating an example of an image stabilization state in a case where a camera shake is excessively-large in a direction other than the roll direction after correcting a camera shake in the roll direction.

FIG. 12 exemplifies a case where the camera shake is excessively-large in a direction other than the roll direction after a camera shake in the roll direction has been corrected (NO in S25). In this example, a maximum rotation amount Rm1 having a provisional value for correcting all the translational component T21 of a new shake correction amount M21 is smaller than a rotational component R11 of a past shake correction amount M11 which has been corrected. In such an exemplary case, if the maximum rotation amount Rm1 having the provisional value is adopted as the result of recalculation similarly to in step S28, this raises a concern about an adverse effect as follows. That is, the rotational component R11 having been corrected at the time of existence of the past shake correction amount M11 may rather become more intense as a result of the subsequent image stabilization operation.

For coping therewith, in the present embodiment, when the IBIS processor 183 determines that the maximum rotation amount Rm1 having the provisional value is not larger than the magnitude of the rotational component R11 of the past shake correction amount M11 (NO in S25), as the example illustrated in FIG. 12, the IBIS processor 183 sets the magnitude of the rotational component R11 of the past shake correction amount M11 as a maximum rotation amount Rm2 resulted from recalculation (S29). By doing this, the maximum rotation amount Rm2 as the result of recalculation can be maintained at larger than or equal to the rotational component R11 having been corrected, which can avoid the aforementioned adverse effect.

Further, based on the maximum rotation amount Rm set as described above, the IBIS processor 183 calculates a corresponding maximum translation amount Tm2 within the sensor movable range 50 (S23). This enables correcting camera shakes in the pitch and yaw directions to a maximum extent, within such a range as to avoid the above adverse effect.

For example, the IBIS processor 183 sets the maximum translation amount Tm2 corresponding to the set maximum rotation amount Rm, as the result of recalculation (S23), thereby ending the recalculation processing of the maximum movement amount (step S13 in FIG. 7), and proceeding to step S14.

According to the aforementioned recalculation processing of the maximum movement amount, in the digital camera 1 according to the present embodiment, the IBIS processor 183 can successively recalculate a maximum rotation amount Rm2 and a maximum translation amount Tm2 to reflect a new image stabilization state. For example, in the aforementioned example of operations, the maximum rotation amount Rm2 and the maximum translation amount Tm2 can be set to perform image stabilization for a translational component, which is presumed to be relatively noticeable, in preference to image stabilization for a rotational component.

In the aforementioned description, there has been described an example of operations where preference is given to image stabilization for a translational component, in the recalculation processing of the maximum movement amount. However, the digital camera 1 according to the present embodiment is not necessarily required to give preference to image stabilization for a translational component. For example, the digital camera 1 according to the present embodiment may give preference to image stabilization for a rotational component, over image stabilization for a translational component. For example, the digital camera 1 according to the present embodiment may execute the recalculation processing of the maximum movement amount, in such a way as to replace the translational component and the rotational component with each other in the example of operations of FIG. 8.

In the aforementioned description, an example is described that the IBIS processor 183 decreases the maximum rotation amount Rm2 as the result of recalculation to the rotational component R20 in step S22. However, the maximum rotation amount Rm2 for the case (YES in S21) of reducing the rotational component R21 in the image stabilization state is not limited thereto. For example, in the aforementioned case (YES in S21), the IBIS processor 183 may decrease the maximum rotation amount Rm2 as the result of recalculation from the new rotational component R21 with an appropriate margin provided thereto. Also, the IBIS processor 183 may decrease the maximum rotation amount Rm2 as the result of recalculation in consideration of the rotational component R11 of the past shake correction amount M11.

3. Conclusion

As described above, the digital camera 1 and the camera body 100, which are each an example of the imaging apparatus according to the present embodiment, include the image sensor 110 as an example of an image sensor, the gyro sensor 184 as an example of a detector, the IBIS processor 183 as an example of a calculation circuitry, and the sensor driver 181 as an example of an image stabilizer. The image sensor 110 captures a subject image via the interchangeable lens 200 as an example of an optical system. The gyro sensor 184 detects an amount of a shake of the imaging apparatus (S11). The IBIS processor 183 performs calculations for image stabilization, based on the shake amount detected by the gyro sensor 184 (S12 to S14). Based on the result of the calculations by the IBIS processor 183, the sensor driver 181 executes image stabilization by translational movement and rotational movement within the sensor movable range 50 of the image sensor 110 as an example of a predetermined movable range (S15). According to the shake correction state in which the image stabilization is being successively executed, the IBIS processor 183 changes a first maximum amount (e.g., a maximum rotation amount) up to which a first movement out of translational movement and rotational movement within the sensor movable range 50 can be executed, and a second maximum amount (e.g., a maximum translation amount) up to which a second movement out of them can be executed.

With the aforementioned imaging apparatus, it is possible to dynamically change the maximum rotation amount and the maximum translation amount within the sensor movable range 50 by reflecting the shake correction state changing from moment to moment during image shake correcting operations. This enables effectively utilizing the sensor movable range 50 within which the imaging apparatus is capable of correcting various camera shakes.

In the imaging apparatus according to the present embodiment, the shake correction state (e.g., the new shake correction amount M20) includes a first component (e.g., the rotational component R20) corresponding to the first movement, and a second component (the translational component T20) corresponding to the second movement. The IBIS processor 183 changes the first and second maximum amounts, such that the smaller one of the first and second components in the shake correction state, the larger the maximum amount up to which movement corresponding to the other component can be executed (see FIG. 8). Thus, according to the margin for one component in the shake correction state, it is possible to expand the range within which image stabilization for the other component can be executed. This enables effectively using the sensor movable range 50.

In the imaging apparatus according to the present embodiment, when the first component in the shake correction state reduces (YES in S21), the IBIS processor 183 decreases the first maximum amount (S22) and increases the second maximum amount (S23), according to the reduced first component. In this way, it is possible to secure the second maximum amount larger, at the timing when the first component has reduced, in the shake correction state changing from moment to moment during image shake correcting operations. This facilitates effective use of the dynamic sensor movable range 50.

In the imaging apparatus according to the present embodiment, when the first component in the shake correction state does not reduced (NO in S21), the IBIS processor 183 calculates the first maximum amount based on the magnitude of the second component in the shake correction state (S24 to S28) and, then, sets the second maximum amount (S23). Thus, for example, when the first component of a camera shake increases, the respective maximum amounts can be set in consideration of the second component of the camera shake. This facilitates effective use of the sensor movable range 50.

In the imaging apparatus according to the present embodiment, the IBIS processor 183 limits the second maximum amount, such that the first maximum amount is larger than or equal to a first component having been corrected by the first movement by the sensor driver 181 (S29, S23). Thus, for example, as illustrated in FIG. 12, when a shake with a second component with an excessive magnitude occurs after a shake with a first component has been corrected, it is possible to suppress an adverse effect of making the corrected shake more intense. This enables effective use of the sensor movable range 50.

The imaging apparatus according to the present embodiment further includes the camera controller 140 as an example of a controller. The camera controller 140 sets the first and second maximum amounts, based on the focal length of the interchangeable lens 200 (S2). The IBIS processor 183 changes the first and second maximum amounts from those set by the camera controller 140, according to the shake correction state in which the image stabilization is being successively executed (S3). This enables updating the respective maximum amounts set based on the focal length or other conditions, according to the image stabilization state. This facilitates dynamically and effectively using the sensor movable range 50.

In the imaging apparatus according to the present embodiment, the first movement is, for example, rotation in an imaging plane for capturing a subject image thereon in the image sensor 110. The second movement is translation along the imaging plane. With the imaging apparatus according to the present embodiment, it is possible to dynamically and effectively use the sensor movable range 50, in such a way as to reflect the shake correction state with the IBIS function. Such effective use can be performed, in such a way as to give preference to image stabilization for a translation component over image stabilization for a rotational component, for example.

Second Embodiment

Hereinafter, a second embodiment of the present disclosure will be described with reference to FIGS. 13 and 14. In the first embodiment, there has been described the digital camera 1 adapted to dynamically recalculate a maximum movement amount according to an image stabilization state. In the second embodiment, there will be described a digital camera 1 adapted to set an upper limit to a recalculated maximum movement amount.

Hereinafter, the digital camera 1 according to the present embodiment will be described by properly omitting descriptions about structures and operations similar to those of the digital camera 1 according to the first embodiment.

Figure 13:
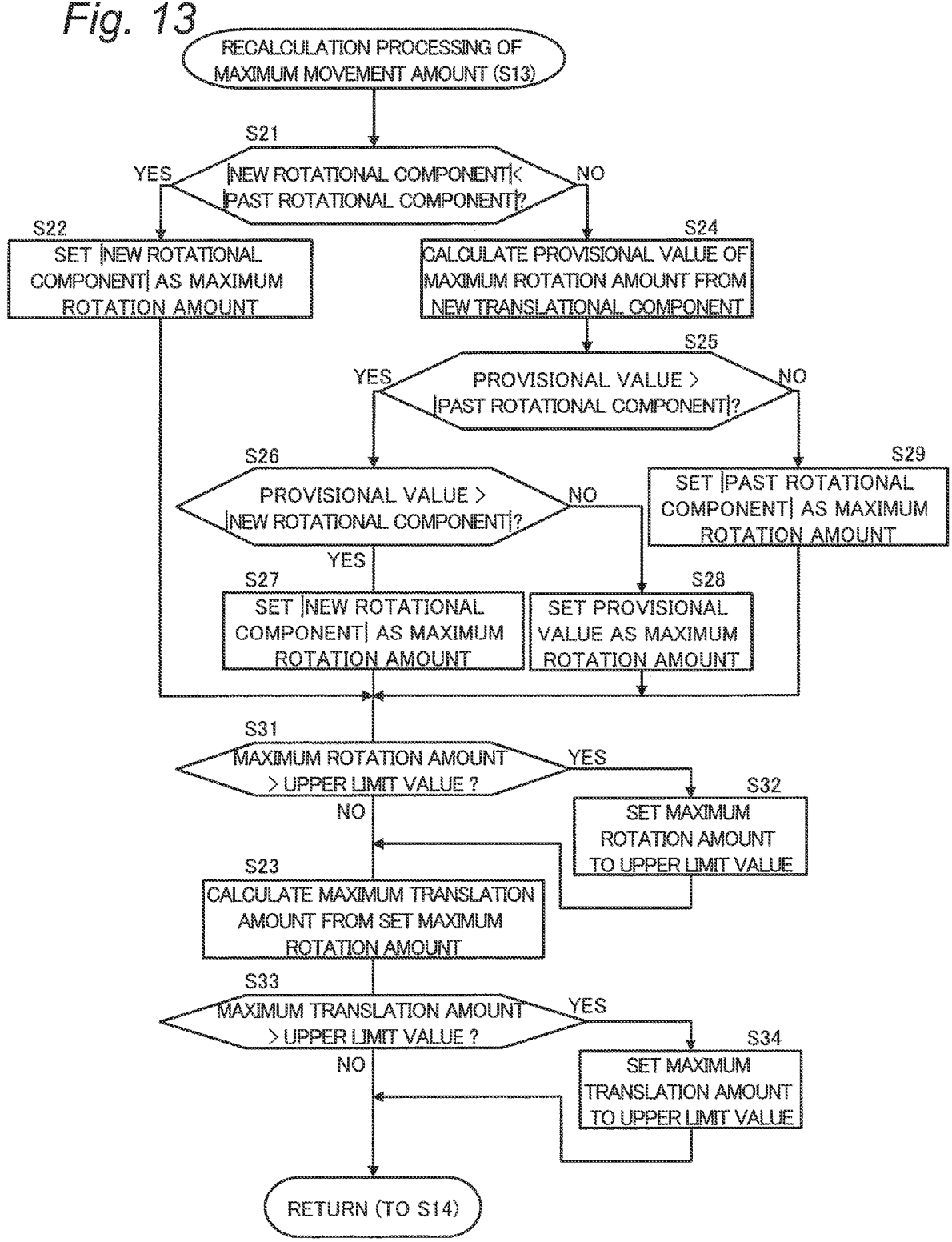
FIG. 13 is a flowchart illustrating recalculation processing of a maximum movement amount in the digital camera according to the second embodiment.

FIG. 13 is a flowchart illustrating recalculation processing of a maximum movement amount in the digital camera 1 according to the second embodiment. When the digital camera 1 according to the present embodiment performs image stabilizing operations similarly to in the first embodiment (see FIGS. 4 and 7), an IBIS processor 183 performs arithmetic processing illustrated in FIG. 13, in step S13.

In the present embodiment, the IBIS processor 183 performs processing in steps S21 to S29 similarly to in the recalculation processing of a maximum movement amount according to the first embodiment (FIG. 8). Further, in addition thereto, the IBIS processor 183 limits the maximum movement amount to upper limit values or less, as illustrated in FIG. 13 (S31 to S34).

Figure 14:
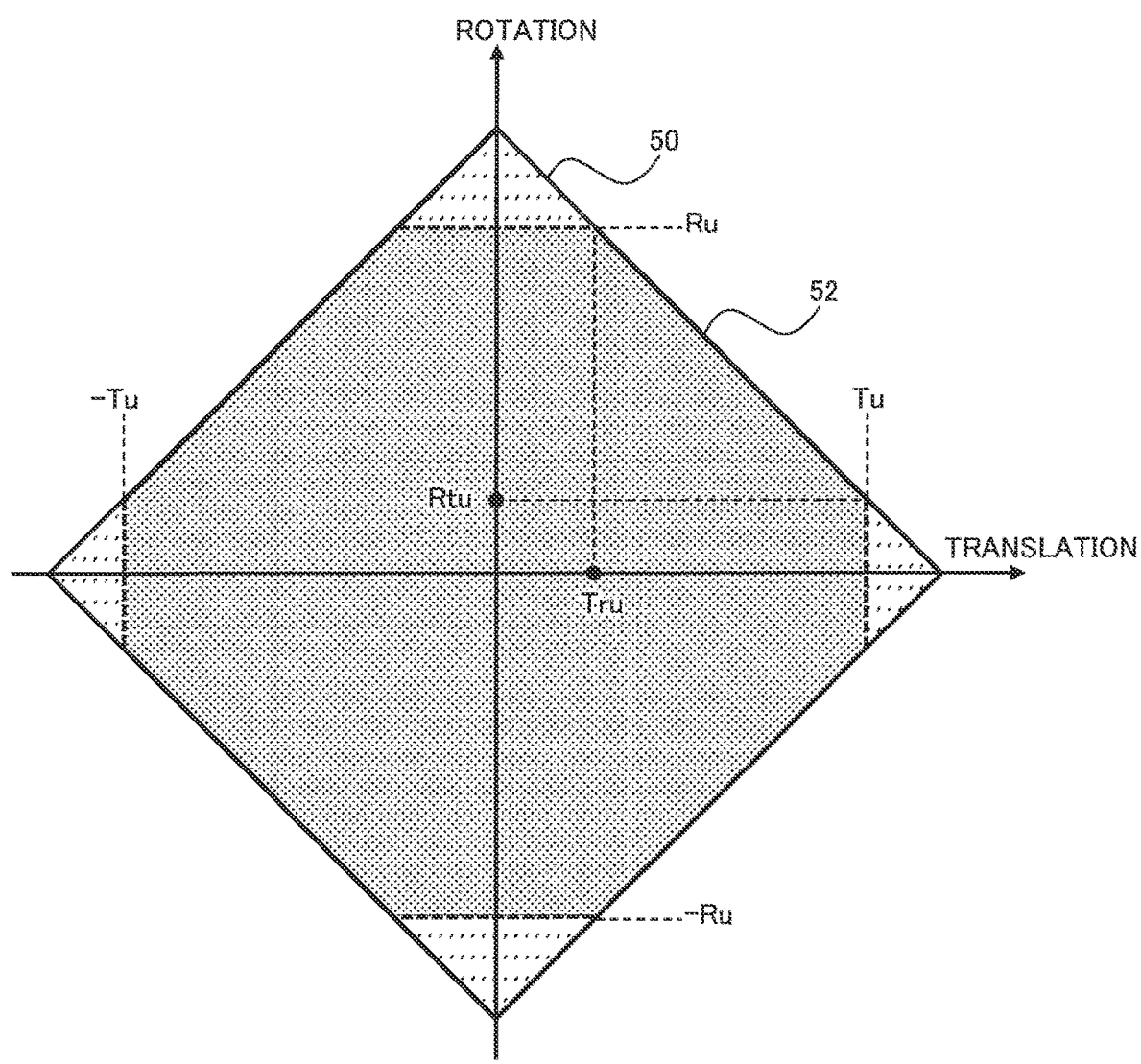
FIG. 14 is a view for explaining upper limit values of a maximum movement amount in the digital camera.

FIG. 14 is a view for explaining the upper limit values Tu and Ru of the maximum movement amount in the digital camera 1 according to the present embodiment. The upper limit values Tu and Ru of the maximum movement amount are appropriately set, before the execution of steps S31 to S34, based on various operation conditions such as a lens state acquired in the digital camera 1. For example, a camera controller 140 may set the upper limit values Tu and Ru of the maximum movement amount, based on lens state data acquired from the interchangeable lens 200 in steps S1 and S4 in FIG. 4. For example, as the focal length in the lens state is larger, the upper limit value Tu of the maximum translation amount may be set larger, or the upper limit value Ru of the maximum rotation amount may be set smaller.

In the flow of FIG. 13, for example, the IBIS processor 183 compares the maximum rotation amount set in any one of steps S22 and S27 to S29 with the upper limit value Ru (S31). When the set maximum rotation amount is larger than the upper limit value Ru (YES in S31), the IBIS processor 183 sets the maximum rotation amount as the result of recalculation at the upper limit value Ru (S32). On the other hand, when the set maximum rotation amount is smaller than or equal to the upper limit value Ru (NO in S31), the IBIS processor 183 proceeds to step S23 without particularly performing the processing in step S32.

Based on the maximum rotation amount set as described above, the IBIS processor 183 calculates a corresponding maximum translation amount within the sensor movable range 50 (S23). Further, the IBIS processor 183 compares the calculated maximum translation amount with the upper limit value Tu (S33). When the calculated maximum translation amount is larger than the upper limit value Tu (YES in S33), the IBIS processor 183 sets the maximum translation amount as the result of recalculation at the upper limit value Tu (S34). On the other hand, when the calculated maximum translation amount is smaller than or equal to the upper limit value Tu (NO in S33), the IBIS processor 183 sets the maximum translation amount calculated in step S23 as the result of recalculation and, then, ends the recalculation processing of the maximum movement amount (FIG. 13), without particularly performing the processing in step S34.

According to the aforementioned processing, the digital camera 1 according to the present embodiment can expand the range within which image stabilization can be substantially executed, to a correction range 52 defined by the upper limit values Tu and Ru of the maximum movement amount, within the sensor movable range 50.

For example, as illustrated in FIG. 14, the upper limit value Ru of the maximum rotation amount can be set to be larger than an amount of rotation Rtu corresponding to the upper limit value Tu of the maximum translation amount within the sensor movable range 50. The upper limit value Tu of the maximum translation amount can be set to be larger than an amount of translation Tru corresponding to the upper limit value Ru of the maximum rotation amount within the sensor movable range 50.

With the respective upper limit values Tu and Ru set as described above, as the example illustrated in FIG. 14, the substantial correction range 52 can be obtained wider than the aforementioned typical correction range 51 (FIG. 5), within the sensor movable range 50. With the digital camera 1 according to the present embodiment, image stabilizing operations with the IBIS function can be executed within such a wide correction range 52. This facilitates effective use of the sensor movable range 50.

When the maximum translation amount is set at the upper limit value Tu in the aforementioned step S34, the IBIS processor 183 may perform recalculation based on the maximum translation amount having the upper limit value Tu, in such a way as to increase the maximum rotation amount within a possible range such as the correction range 52.

As described above, in the imaging apparatus according to the present embodiment, the IBIS processor 183 limits a first maximum amount to a first predetermined value (e.g., the upper limit value Ru) or less within the sensor movable range 50 (S31, S32). The IBIS processor 183 limits a second maximum amount to a second predetermined value (e.g., the upper limit value Tu) or less within the sensor movable range 50 (S33, S34). This enables fully and effectively using the sensor movable range 50, within a range equal to or less than the upper limit values Ru and Tu, for example.

In the aforementioned description, there has been described an example where both the maximum translation amount and the maximum rotation amount are limited. However, the digital camera 1 according to the present embodiment is not limited thereto. For example, in the digital camera 1 according to the present embodiment, the IBIS processor 183 may limit any one of the maximum translation amount and the maximum rotation amount, and steps S31 and S32 or steps S33 and S34 in FIG. 13 can be omitted. Even in this case, it is possible to effectively use the sensor movable range 50 similarly to in the aforementioned case, within an appropriately limited range, in image stabilization.

Third Embodiment

Hereinafter, a third embodiment of the present disclosure will be described with reference to FIG. 15. In the first embodiment, there has been described the example of operations of the digital camera 1 for performing image stabilization with the IBIS function. In the third embodiment, there will be described an example of operations of a digital camera 1 for performing image stabilization through cooperative control of an IBIS function and an OIS function.

Hereinafter, the digital camera 1 according to the present embodiment will be described by properly omitting descriptions about structures and operations similar to those of the digital cameras 1 according to the first and second embodiments.

In the present embodiment, in the digital camera 1, an OIS processor 223 and an IBIS processor 183 simultaneously perform image stabilizing operations in parallel. Such simultaneous and parallel image stabilizing operations are executed, after the proportions (i.e., the correction proportions) of the amounts of image stabilizations each performed by the respective processors 223,183 is set in advance. The correction proportions include an IBIS ratio indicating the proportion of the IBIS function, and an OIS ratio indicating the proportion of the OIS function, for example.

Specifically, the OIS processor 223 generates shake detection signals indicating shakes in the pitch direction and the yaw direction, based on the result of detection by a gyro sensor 224 in an interchangeable lens 200. The OIS processor 223 controls an OIS driver 221 for driving an OIS lens 220, to perform image stabilization by a shake correction amount corresponding to the preset OIS correction ratio, out of the shake amounts indicated by the generated shake detection signals.

At this time, the IBIS processor 183 generates shake detection signals indicating shakes in the pitch direction, the yaw direction and the roll direction, based on the result of detection by a gyro sensor 184 in a camera body 100. The IBIS processor 183 causes a sensor driver 181 to translationally move an image sensor 110, to perform image stabilization by a shake correction amount corresponding to the preset IBIS correction ratio, out of the shake amounts in the pitch direction and the yaw direction which are indicated by the generated shake detection signals. On the other hand, regarding the shake amount in the roll direction, the IBIS processor 183 causes the sensor driver 181 to rotationally move the image sensor 110, to separately perform image stabilization within the range of a set maximum rotation amount.

According to the aforementioned operations of the digital camera 1, the OIS processor 223 and the IBIS processor 183 successively perform operations for correcting camera shakes by amounts corresponding to their respective correction proportions, out of detected shake amounts. This enables the entire digital camera 1 to realize appropriate image stabilization. At this time, the range of operations of each processor 223 or 183 for coping with a shake amount occurring every moment is reduced by an amount corresponding to the correction ratio set as the correction proportion for each processor. This makes it easier to avoid such a situation where the respective processors 223 and 183 collide with each other at their edges.

The digital camera 1 according to the present embodiment performs image stabilizing operations by dynamically setting the correction proportions as described above. There will be described overall operations relating to image stabilization in the digital camera 1 according to the present embodiment, with reference to FIG. 15.

Figure 15:
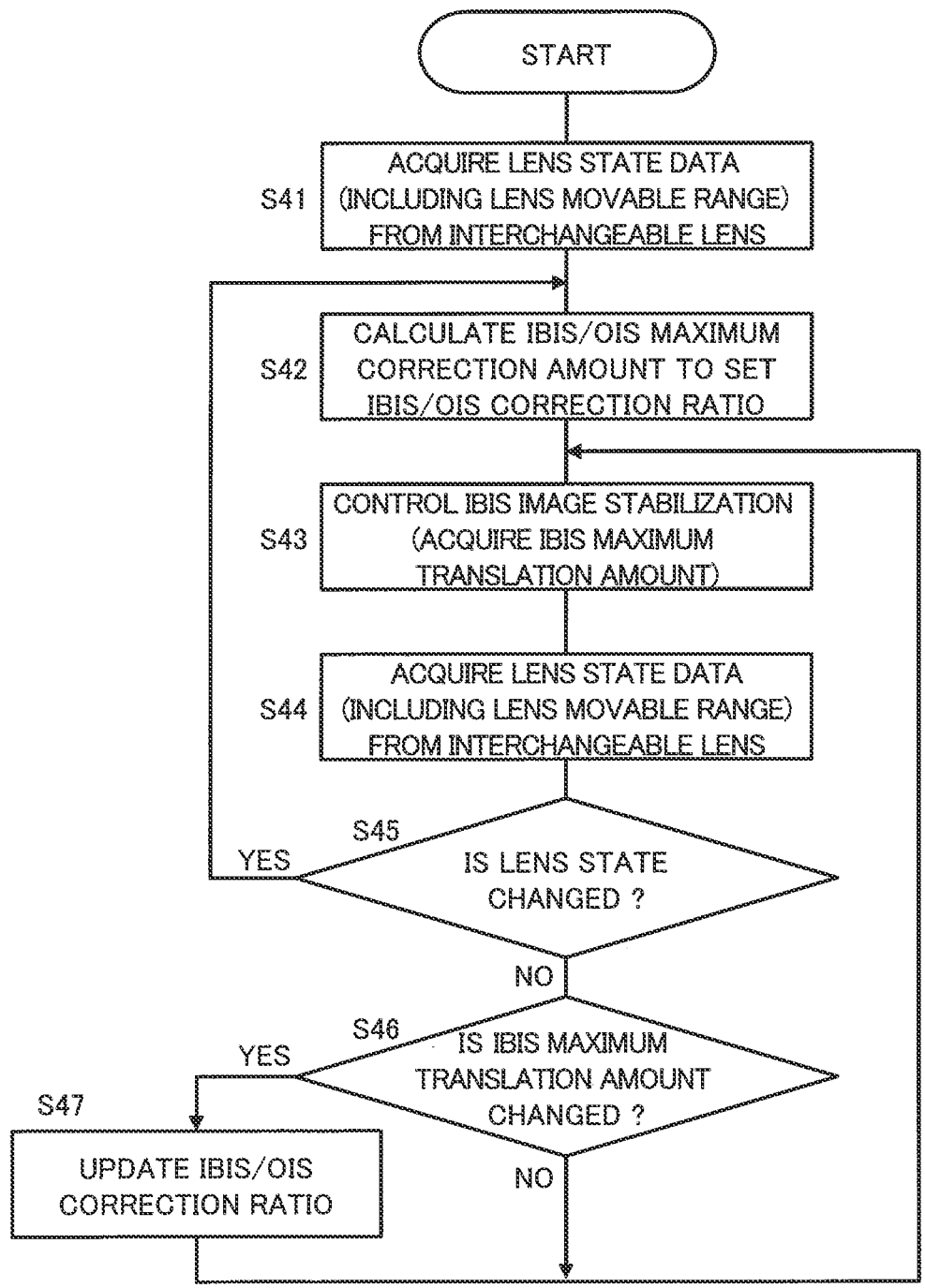
FIG. 15 is a flowchart illustrating overall operations for image stabilization in a digital camera according to a third embodiment.

FIG. 15 is a flowchart illustrating overall operations for image stabilization in the digital camera 1 according to the third embodiment. In the digital camera 1 according to the present embodiment, a camera controller 140 executes the processing of FIG. 15, instead of the processing of FIG. 4 in the first embodiment, for example.

First, the camera controller 140 performs data communication with an interchangeable lens 200 to acquire lens state data, similarly to in step S1 in FIG. 4, for example (S41). In the present embodiment, the lens state data includes information on a lens state such as a lens movable range and a focal length in the interchangeable lens 200, for example.

Based on the acquired information, the camera controller 140 calculates a maximum translation amount and a maximum rotation amount for the IBIS function, similarly to in step S2 in FIG. 4, for example. Further, in addition, the camera controller 140 sets the correction proportion between the OIS processor 223 and the IBIS processor 183 (S42).

For example, the camera controller 140 calculates the OIS correction ratio and the IBIS correction ratio by the following arithmetic formula.

(OIS correction ratio)=(OIS maximum correction amount)/(OIS maximum correction amount+ IBIS maximum correction amount)

(IBIS correction ratio)=(IBIS maximum correction amount)/(OIS maximum correction amount+ IBIS maximum correction amount)

In the aforementioned formula, the OIS maximum correction amount is set according to the lens movable range and the lens state such as the focal length in the interchangeable lens 200, for example. The OIS maximum correction amount may be managed by a lens controller 240, for example, or may be calculated by the camera controller 140 based on the information acquired from the interchangeable lens 200. The IBIS maximum correction amount is a maximum translation amount which is set for the IBIS function according to the aforementioned respective embodiments, for example.

For example, the IBIS maximum correction amount in the first step S42 is a maximum translation amount calculated from the focal length by the camera controller 140 similarly to in the first embodiment. The camera controller 140 transmits the calculated OIS correction ratio to the interchangeable lens 200 via a body mount 150. Further, the camera controller 140 sets the calculated IBIS correction ratio in the IBIS processor 183.

The IBIS processor 183 performs image stabilizing operations as described above, using the set IBIS correction ratio. During such image stabilizing operations with the IBIS function, the IBIS processor 183 performs recalculation processing of a maximum movement amount (FIG. 8 or 13), similarly to in the first or second embodiment, for example. Thus, a maximum translation amount and a maximum rotation amount corresponding to the real-time image stabilization state are successively recalculated. At this time, in the interchangeable lens 200, in parallel, the OIS processor 223 successively executes image stabilizing operations with the set OIS correction ratio.

The camera controller 140 according to the present embodiment acquires a maximum translation amount recalculated by the IBIS processor 183, as the IBIS maximum correction amount (S43), for controlling image stabilizing operations by the IBIS processor 183, similarly to in step S3 in the first embodiment, for example. The IBIS maximum correction amount acquired described above is used in step S47 or used in the next step S42.

The camera controller 140 acquires lens state data from the interchangeable lens 200 in a predetermined control cycle (S44), and determines whether or not the lens state is changed (S45), similarly to in steps S4 and S5 in the first embodiment, for example. When the lens state is changed (YES in S45), the camera controller 140 performs the processing in and after step S42 again. For example, when the focal length changes in the interchangeable lens 200, a correction proportion corresponding to the changed focal length is newly set.

Furthermore, for example, when the lens state is not changed (NO in S45), the camera controller 140 according to the present embodiment determines whether or not the IBIS maximum correction amount is changed from that at the time of setting the correction proportion, based on the maximum translation amount (S43) acquired from the IBIS processor 183 (S46).

When the IBIS maximum correction amount is changed (YES in S46), the camera controller 140 updates the setting of the correction proportion, based on the changed IBIS maximum correction amount (S47). For example, the camera controller 140 calculates a new OIS correction ratio and a new IBIS correction ratio, with an arithmetic formula similar to that in step S42, using the changed IBIS maximum correction amount (S43). Further, the camera controller 140 sets the respective calculated correction ratios in the interchangeable lens 200 and the IBIS processor 183.

When the IBIS maximum correction amount is not changed (NO in S46), the camera controller 140 repeats the processing in and after step S43 in a predetermined control cycle.

According to the aforementioned processing, the setting of the correction proportion is dynamically updated according to the image stabilization state (S47) in image stabilizing operations based on the cooperative control between the interchangeable lens 200 and the camera body 100 in the digital camera 1, using the correction proportion between the OIS function and the IBIS function. This enables effectively utilizing the lens movable range in the interchangeable lens 200, in addition to the sensor movable range 50 in the camera body 100, by utilizing the maximum movement amount which is recalculated by the IBIS processor 183 and reflects the image stabilization state.

As described above, the imaging apparatus according to the present embodiment further includes the camera controller 140 as an example of a controller. The controller controls the proportion (i.e., the correction proportion) between a first image stabilization as an image stabilization by the sensor driver 181, and a second image stabilization performed in the interchangeable lens 200 (see FIG. 15). When the IBIS processor 183 changes first and second maximum amounts according to the shake correction state, the controller changes the proportion between the first and second image stabilizations (S47). With the imaging apparatus according to the present embodiment, the correction proportion is changed according to the first and second maximum amounts being dynamically changed in such a way as to reflect the image stabilization state. This enables effectively using the range within which each of the first and second image stabilizations can be executed.

The imaging apparatus according to the present embodiment may further include a body mount 150 as an example of a communication interface. The communication interface performs data communication with the interchangeable lens 200 constituting an optical system. The controller transmits the result of the change of the proportion between the first and second image stabilizations, to the interchangeable lens 200 through the communication interface. Thus, information corresponding to the first and second maximum amounts being dynamically changed in such a way as to reflect the image stabilization state is transmitted to the interchangeable lens 200. This makes it easier to perform image stabilization through the cooperative control between the camera body 100 and the interchangeable lens 200 in the digital camera 1.

Furthermore, the imaging apparatus according to the present embodiment includes the image sensor 110 for capturing a subject image through the interchangeable lens 200, the gyro sensor 184 for detecting a shake amount of the imaging apparatus, the sensor driver 181 for executing first image stabilization through multiple movements (e.g., translational movement and rotational movement) within the predetermined sensor movable range 50 of the image sensor 110, based on the shake amount detected by the gyro sensor 184, and the controller for controlling the proportion between the first image stabilization by the sensor driver 181 and the second image stabilization performed in the interchangeable lens 200. According to the shake correction state in which image stabilization is being successively executed, a first maximum amount and a second maximum amount are changed, wherein a first movement out of the multiple movements by the sensor driver 181 can be executed within the sensor movable range 50 up to the first maximum amount, and a second movement can be executed up to the second maximum amount. When the first and second maximum amounts are changed according to the shake correction state, the controller changes the proportion between the first and second image stabilizations. This also enables effectively utilizing the range within which the imaging apparatus can correct various camera shakes.

Other Embodiments

As described above, the first to third embodiments have been described as examples of the techniques disclosed in the present application. However, the techniques according to the present disclosure are not limited thereto and can also be applied to embodiments which appropriately make modifications, substitutions, additions, or omissions thereto. Further, respective constituents described in the aforementioned first to third embodiments can be combined to provide a new embodiment. Therefore, other embodiments will be described hereinafter.

Although, in the aforementioned first to third embodiments, there have been described examples where image stabilizing operations of the digital camera 1 are performed during shooting a moving image, image stabilizing operations are not particularly limited to those during shooting a moving image. The digital camera 1 according to the present embodiment may perform image stabilizing operations similarly to in the aforementioned respective embodiments during shooting a still image or during standby for shooting. Further, at this time, recalculation of a maximum movement amount for the IBIS function can be performed, at appropriate timing, according to the image stabilization state.

For example, during cooperative control similar to that in the third embodiment, the digital camera 1 according to the present embodiment may recalculate a maximum movement amount for the IBIS function and may update the correction proportion according to the image stabilization state before and during the preparation for light exposure for a still image, while the digital camera 1 may not recalculate a maximum movement amount and may not update the correction proportion during the light exposure for the still image. By doing this, it is possible to avoid the influence of correction errors which may be induced by dynamic change of the maximum movement amount for the IBIS function and, therefore, the IBIS correction ratio and the OIS correction ratio, within the light exposure time period.

In the aforementioned respective embodiments, there have been exemplified a shake correction amount in the pitch direction and a shake correction amount in the yaw direction as examples of a translational component in a shake correction state. However, the translational component is not limited thereto. In the present embodiment, a translational component in a shake correction state may be either any one of a shake correction amount in the pitch direction and a shake correction amount in the yaw direction, or an accelerating translation in the horizontal direction or the vertical direction of the digital camera 1 itself. The digital camera 1 according to the present embodiment may include an acceleration sensor as a shake sensor, i.e., detector.

In the aforementioned respective embodiments, there have been described examples of operations of the digital camera 1 for recalculating a maximum movement amount for the IBIS function. The digital camera 1 according to the present embodiment may recalculate a maximum movement amount for an electronic image stabilizer (EIS) function, for example, in addition to or instead of the IBIS function.

For example, image stabilizing operations with such an EIS function are performed by adjusting an area of image data to be cut out by an image sensor, through translation and rotation thereof within a preset margin range, according to camera shakes of the digital camera 1. The digital camera 1 according to the present embodiment may successively recalculate a maximum translation amount of the area to be cut out, and a maximum rotation amount thereof, in such a way as to reflect an image stabilization state, by using such a margin of the EIS function as a movable range. This makes it easier to effectively use the movable range for the EIS function, similarly to in the aforementioned respective embodiments. Further, the digital camera 1 according to the present embodiment may perform cooperative control between such an EIS function and the IBIS function and/or the OIS function, similarly to in the third embodiment.

Although, in the aforementioned respective embodiments, a digital camera of an interchangeable-lens type has been described as an example of the imaging apparatus; the imaging apparatus according to the present embodiment may be a digital camera of a non-interchangeable lens type. The concept of the present disclosure may also be applied to a movie camera, and electronic appliances having various image pickup functions, such as a portable phone equipped with a camera, a smartphone, and a PC, as well as to a digital camera.

Summarized Aspects

Hereinafter, various aspects according to the present disclosure will be listed.

A first aspect according to the present disclosure provides an imaging apparatus including: an image sensor that captures a subject image via an optical system; a detector that detects a shake amount of the imaging apparatus; a calculation circuitry that performs a calculation for image stabilization, based on the shake amount detected by the detector; and an image stabilizer that performs the image stabilization by translational movement and rotational movement within a predetermined movable range of the image sensor, based on a result of the calculation by the calculation circuitry. The calculation circuitry changes a first maximum amount and a second maximum amount, according to a result of successively calculating a shake correction amount, the first maximum amount allowing a first movement that is one of the translational movement and the rotational movement, the second maximum amount allowing a second movement that is the other of the translational movement and the rotational movement, the shake correction amount canceling the shake amount.

According to a second aspect, in the imaging apparatus according to the first aspect, the shake correction amount includes a first component corresponding to the first movement, and a second component corresponding to the second movement. The calculation circuitry changes the first and second maximum amounts to increase a corresponding maximum amount as one component of the first and second components in the calculated shake correction amount is smaller, the corresponding maximum amount allowing a corresponding movement to the other component of the first and second components.

According to a third aspect, in the imaging apparatus according to the second aspect, when the first component in the calculated shake correction amount reduces, the calculation circuitry decreases the first maximum amount and increases the second maximum amount, according to the reduced first component.

According to a fourth aspect, in the imaging apparatus according to the second or third aspect, when the first component in the calculated shake correction amount does not reduce, the calculation circuitry calculates a provisional value of the first maximum amount, based on a magnitude of the second component in the calculated shake correction amount, for setting the second maximum amount.

According to a fifth aspect, in the imaging apparatus according to any one of the second to fourth aspects, wherein, when the first component in the calculated shake correction amount does not reduce, the calculation circuitry limits the second maximum amount to allow the first maximum amount to be larger than or equal to a corrected first component by the first movement performed by the image stabilizer.

According to a sixth aspect, in the imaging apparatus according to anyone of the first to fifth aspects, the calculation circuitry performs at least one of: limiting the first maximum amount to a first predetermined value or less within the movable range; or limiting the second maximum amount to a second predetermined value or less within the movable range.

According to a seventh aspect, the imaging apparatus according to anyone of the first to sixth aspects further includes controller that sets the first and second maximum amounts, based on a focal length in the optical system. The calculation circuitry changes each maximum amount from the first and second maximum amounts set by the controller, according to the calculated shake correction amount.

According to an eighth aspect, the imaging apparatus according to anyone of the first to seventh aspects further includes a controller that controls a proportion between first image stabilization and second image stabilization, the first image stabilization being performed by the image stabilizer, and the second image stabilization being performed in the optical system. The controller changes the proportion set between the first and second image stabilizations, when the calculation circuitry changes the first and second maximum amounts according to the calculated shake correction amount.

According to a ninth aspect, in the imaging apparatus according to any one of the first to eighth aspects, the first movement is rotation in an imaging plane for capturing the subject image thereon in the image sensor, and the second movement is translation along the imaging plane.

A tenth aspect according to the present disclosure provides an imaging apparatus including: an image sensor that captures a subject image via an optical system; a detector that detects a shake amount of the imaging apparatus; an image stabilizer that performs first image stabilization using multiple movements within a predetermined movable range, based on the shake amount detected by the detector, and a controller that controls a proportion set between the first image stabilization, which is performed by the image stabilizer, and second image stabilization performed in the optical system. A first maximum amount and a second maximum amount are changed, according to a result of successively calculating a shake correction amount, the first maximum amount allowing a first movement that is one of the multiple movements, the second maximum amount allowing a second movement that is the other of the multiple movements, the shake correction amount canceling the shake amount. The controller changes the proportion between the first and second image stabilizations, when the first and the second maximum amounts are changed according to the calculated shake correction amount.

According to an eleventh aspect, in the imaging apparatus according to tenth aspect, the calculation circuitry detects a decrease of the first component in the calculated shake correction amount, and changes the first and second maximum amounts to increase the second maximum amount in preference to the first maximum amount, according to a detection result of the decrease of the first component.

According to a twelfth aspect, in the imaging apparatus according to tenth or eleventh aspect, when a state of the optical system changes, the controller changes the proportion. When the state of the optical system does not change, referring to the calculated shake correction amount, the controller changes the proportion in a case where the first and second maximum amounts changes, and does not change the proportion in a case where the first and second maximum amounts does not change.

As described above, the embodiments have been described as examples of the techniques according to the present disclosure. The accompanying drawings and detailed descriptions have been provided therefor.

Therefore, the constituents described in the accompanying drawings and the detailed descriptions may include not only essential constituents for solving the problem but also constituents unessential for solving the problem, for the purpose of illustration of the aforementioned techniques. Thus, such unessential constituents should not be immediately recognized as being essential on the grounds that those unessential constituents are described in the accompanying drawings or in the detailed descriptions.

Furthermore, since the aforementioned embodiments are intended to illustrate the techniques according to the present disclosure, various modifications, substitutions, additions, omissions, and the like can be made thereto within the scope of the claims or the equivalents thereto.

INDUSTRIAL APPLICABILITY

The concept of the present disclosure can be applied to an electronic apparatus having an image pickup function equipped with a camera shake correcting function (an imaging apparatus such as a digital camera or a camcorder, a portable phone, a smartphone, etc.).

The invention claimed is:

1. An imaging apparatus comprising:
an image sensor that captures a subject image via an optical system;
a detector that detects a shake amount of the imaging apparatus;
a calculation circuitry that performs a calculation for image stabilization, based on the shake amount detected by the detector; and
an image stabilizer that performs the image stabilization by translational movement and rotational movement within a predetermined movable range of the image sensor, based on a result of the calculation by the calculation circuitry,
wherein the calculation circuitry changes a first maximum amount and a second maximum amount within the movable range, according to a result of successively calculating a shake correction amount, the first maximum amount allowing a first movement that is one of the translational movement and the rotational movement, the second maximum amount allowing a second movement that is the other of the translational movement and the rotational movement.

2. The imaging apparatus according to claim 1, wherein the shake correction amount includes a first component corresponding to the first movement, and a second component corresponding to the second movement, and
the calculation circuitry changes the first and second maximum amounts to increase a corresponding maximum amount as one component of the first and second components in the calculated shake correction amount is smaller, the corresponding maximum amount allowing a corresponding movement to the other component of the first and second components.

3. The imaging apparatus according to claim 2, wherein, when the first component in the calculated shake correction amount reduces, the calculation circuitry decreases the first maximum amount and increases the second maximum amount, according to the reduced first component.

4. The imaging apparatus according to claim 2, wherein, when the first component in the calculated shake correction amount does not reduce, the calculation circuitry calculates a provisional value of the first maximum amount, based on a magnitude of the second component in the calculated shake correction amount, for setting the second maximum amount.

5. The imaging apparatus according to claim 2, wherein, when the first component in the calculated shake correction amount does not reduce, the calculation circuitry limits the second maximum amount to allow the first maximum amount to be larger than or equal to a corrected first component by the first movement performed by the image stabilizer.

6. The imaging apparatus according to claim 2, wherein the calculation circuitry
detects a decrease of the first component in the calculated shake correction amount, and
changes the first and second maximum amounts to increase the second maximum amount in preference to the first maximum amount, according to a detection result of the decrease of the first component.

7. The imaging apparatus according to claim 1, wherein the calculation circuitry performs at least one of: limiting the first maximum amount to a first predetermined value or less within the movable range; or limiting the second maximum amount to a second predetermined value or less within the movable range.

8. The imaging apparatus according to claim 1, further comprising a controller that sets the first and second maximum amounts, based on a focal length in the optical system,
wherein the calculation circuitry changes each maximum amount from the first and second maximum amounts set by the controller, according to the calculated shake correction amount.

9. The imaging apparatus according to claim 1, further comprising a controller that controls a proportion between first image stabilization and second image stabilization, the first image stabilization being performed by the image stabilizer, and the second image stabilization being performed in the optical system, wherein the controller changes the proportion set between the first and second image stabilizations, when the calculation circuitry changes the first and second maximum amounts according to the calculated shake correction amount.

10. The imaging apparatus according to claim 1, wherein the first movement is rotation in an imaging plane for capturing the subject image thereon in the image sensor, and the second movement is translation along the imaging plane.

11. An imaging apparatus comprising:
an image sensor that captures a subject image via an optical system;
a detector that detects a shake amount of the imaging apparatus;
an image stabilizer that performs first image stabilization using multiple movements within a predetermined movable range, based on the shake amount detected by the detector, and
a controller that controls a proportion set between the first image stabilization, which is performed by the image stabilizer, and second image stabilization performed in the optical system;
wherein a first maximum amount and a second maximum amount are changed within the movable range, according to a result of successively calculating a shake correction amount, the first maximum amount allowing a first movement that is one of the multiple movements, the second maximum amount allowing a second movement that is the other of the multiple movements, and
the controller changes the proportion between the first and second image stabilizations, when the first and the second maximum amounts are changed according to the calculated shake correction amount.

12. The imaging apparatus according to claim 11, wherein
when a state of the optical system changes, the controller changes the proportion, and
when the state of the optical system does not change, referring to the calculated shake correction amount, the controller changes the proportion in a case where the first and second maximum amounts changes, and does not change the proportion in a case where the first and second maximum amounts does not change.

* * * * *